US007210124B2

(12) United States Patent
Chan

(10) Patent No.: US 7,210,124 B2
(45) Date of Patent: Apr. 24, 2007

(54) REFORMULATING RESOURCES WITH NODES REACHABLE FROM DEFINED ENTRY POINTS

(75) Inventor: Hon Keat W. Chan, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 763 days.

(21) Appl. No.: 10/463,480

(22) Filed: Jun. 16, 2003

(65) Prior Publication Data

US 2004/0255273 A1 Dec. 16, 2004

(51) Int. Cl.
*G06F 9/44* (2006.01)
*G06F 9/45* (2006.01)

(52) U.S. Cl. .................. 717/120; 717/162; 717/163

(58) Field of Classification Search ........ 717/120–123, 717/140, 162–165, 168–171, 108, 116, 144
See application file for complete search history.

(56) References Cited

U.S. PATENT DOCUMENTS

| 5,664,191 | A | 9/1997 | Davidson et al. |
| 5,774,722 | A | 6/1998 | Gheith |
| 5,848,274 | A | 12/1998 | Hamby et al. |
| 5,933,640 | A | 8/1999 | Dion |
| 6,167,564 | A * | 12/2000 | Fontana et al. ............. 717/104 |
| 6,175,957 | B1 | 1/2001 | Ju et al. |
| 6,185,734 | B1 | 2/2001 | Saboff et al. |
| 6,199,196 | B1 | 3/2001 | Madany et al. |
| 6,226,792 | B1 * | 5/2001 | Goiffon et al. ............. 717/120 |
| 6,282,701 | B1 * | 8/2001 | Wygodny et al. ........... 717/125 |
| 6,292,934 | B1 | 9/2001 | Davidson et al. |
| 6,314,558 | B1 | 11/2001 | Angel et al. |
| 6,321,240 | B1 | 11/2001 | Chilimbi et al. |
| 6,330,692 | B1 | 12/2001 | Kamuro et al. |
| 6,336,122 | B1 | 1/2002 | Lee et al. |
| 6,381,735 | B1 | 4/2002 | Hunt |
| 6,385,741 | B1 | 5/2002 | Nakamura |
| 6,385,768 | B1 * | 5/2002 | Ziebell ....................... 717/121 |
| 6,412,106 | B1 | 6/2002 | Leask et al. |
| 6,427,230 | B1 * | 7/2002 | Goiffon et al. ............. 717/108 |
| 6,460,178 | B1 * | 10/2002 | Chan et al. ................. 717/147 |
| 6,546,551 | B1 | 4/2003 | Sweeney et al. |
| 6,662,356 | B1 | 12/2003 | Edwards et al. |
| 6,665,866 | B1 * | 12/2003 | Kwiatkowski et al. ...... 717/159 |
| 6,678,886 | B2 * | 1/2004 | Kumon ....................... 717/151 |
| 6,718,535 | B1 * | 4/2004 | Underwood ................ 717/101 |
| 6,851,111 | B2 * | 2/2005 | McGuire et al. ............ 717/166 |
| 6,957,422 | B2 * | 10/2005 | Hunt .......................... 717/130 |

(Continued)

OTHER PUBLICATIONS

Sreedhar et al, "A framework for interprocedural optimization in the presence of dyanmic class loading", ACM PLDI, pp. 196-207, 2000.*

(Continued)

*Primary Examiner*—Anil Khatri
(74) *Attorney, Agent, or Firm*—Klarquist Sparkman LLP

(57) ABSTRACT

Historically, resources (e.g., dynamic linked libraries) were organized based on factors including the expertise of development teams. Unfortunately, this creates shared resources of much greater functionality than required by any one client application. By reformulating shared resources according to the nodes reachable from a set of defined entry points, the reformulated resources will contain nodes of relevance. This optimization reduces memory requirements which is useful for embedded systems and for reducing disk accesses.

26 Claims, 23 Drawing Sheets

U.S. PATENT DOCUMENTS

| | | | |
|---|---|---|---|
| 7,003,759 B2* | 2/2006 | Jameson | 717/120 |
| 7,020,329 B2* | 3/2006 | Prempraneerach et al. | 382/164 |
| 7,058,941 B1* | 6/2006 | Venkatesan et al. | 717/168 |
| 7,076,784 B1* | 7/2006 | Russell et al. | 719/315 |
| 2003/0204836 A1 | 10/2003 | Srivastava et al. | |

OTHER PUBLICATIONS

Hammer et al, "Dynamic path conditions in dependence graphs", ACM PEPM, pp. 58-67, 2006.*

Vlaovic et al, "Improving BTB performance in the presence of DLLs", IEEE, pp. 1-10, 2000.*

Milenkovic et al, "A framework for trusted instruction execution via basic block signature verification", ACM SE, pp. 191-196, 2004.*

U.S. Appl. No. 09/343,805, filed Jun. 30, 1999.

U.S. Appl. No. 09/712,063, filed Nov. 14, 2000.

Amitabh Srivastava et al.; Effectively Prioritizing Tests in Development Environment; International Symposium on Software Testing and Analysis, Jul. 2002; 11 pages.

Zheng Wang et al.; BMAT—A Binary Matching Tool for Stale Profile Propagation; Journal of Instruction—Level Parallelism 2; Apr. 2000; pp. 1-20.

Amitabh Srivastava et al.; Vulcan Binary transformation in a distributed environment; Technical Report; Apr. 2001; pp. 1-12.

Srivastava et al., "Effectively Prioritizing Tests in Development Environment," Feb. 2002, MSR-TR-2002-15, Publisher: Association for Computing Machinery, Inc., pp. 1-10.

* cited by examiner

FIG. 11
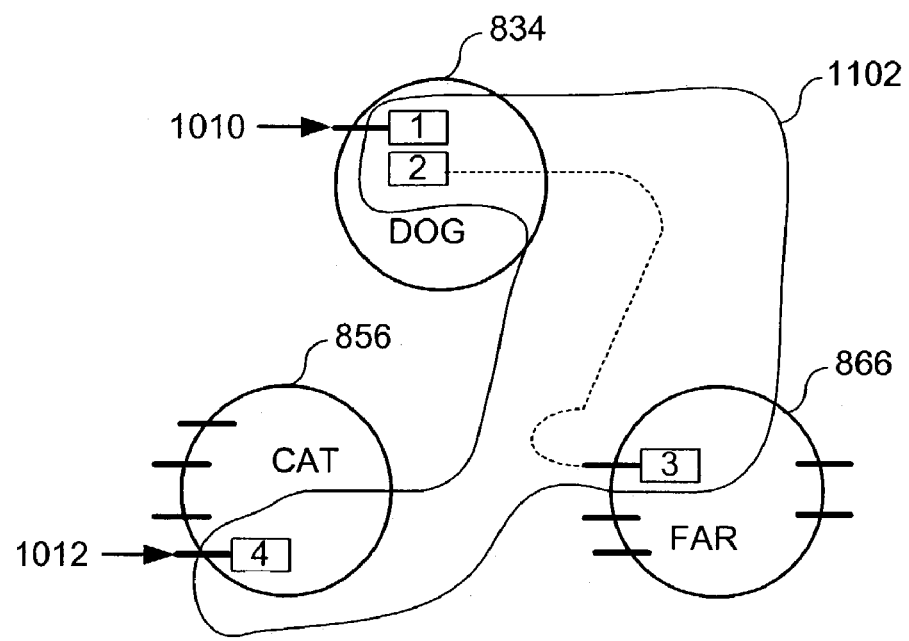
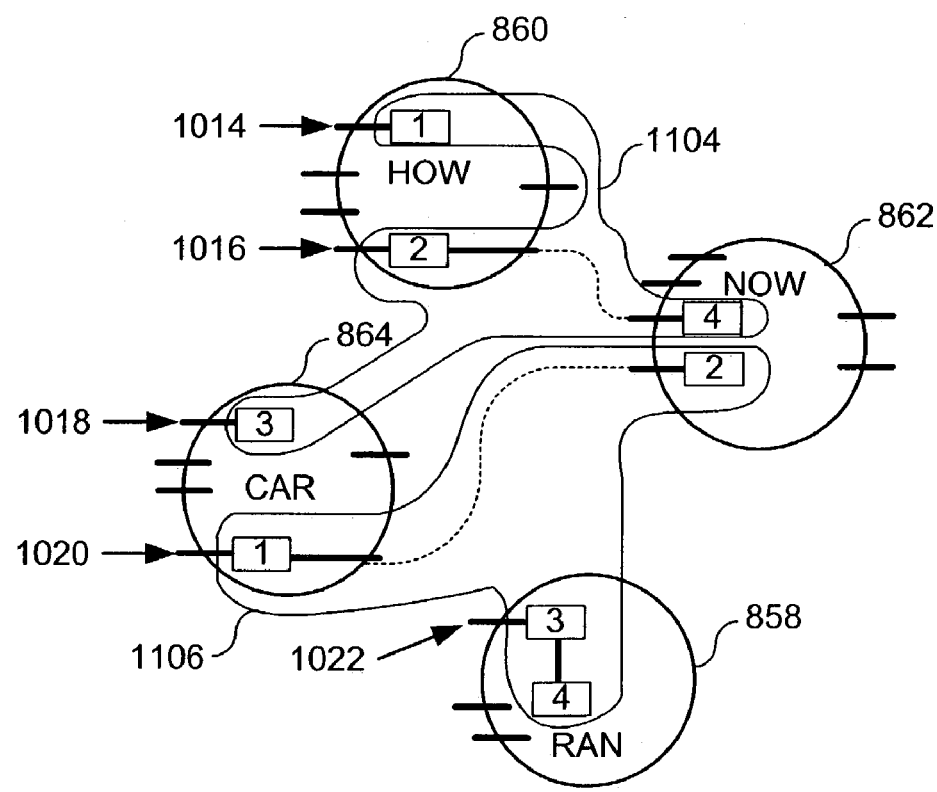

FIG. 13
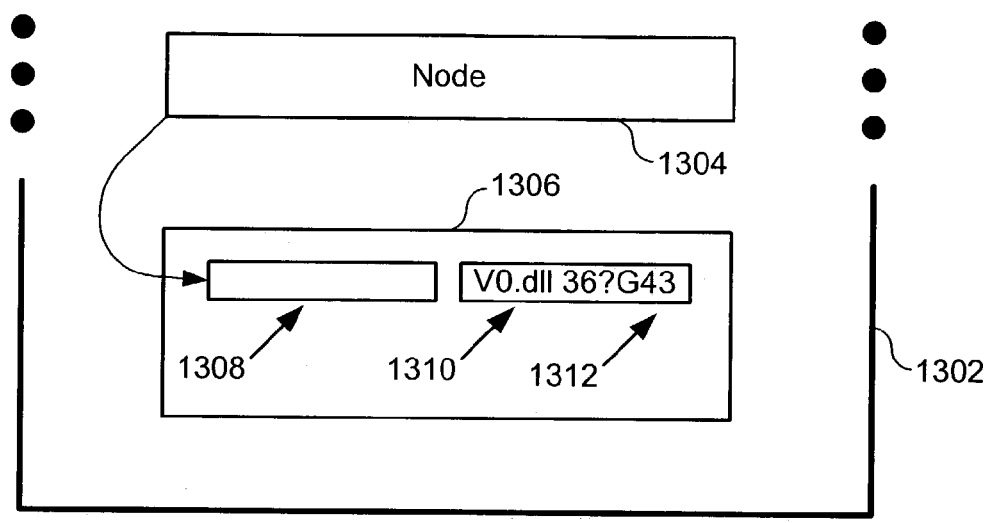
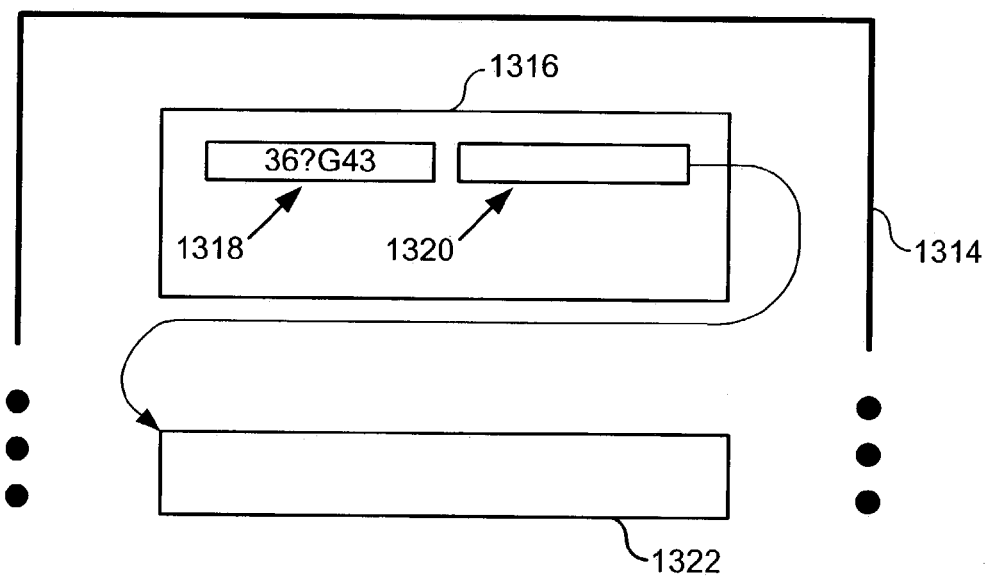

US 7,210,124 B2

REFORMULATING RESOURCES WITH NODES REACHABLE FROM DEFINED ENTRY POINTS

FIELD OF INVENTION

This invention relates generally to creating optimized resources, and more particularly to reformulating resources with nodes reachable from defined entry points.

RELATED APPLICATIONS

The present application is related to U.S. Patent Application entitled "CLASSIFYING SOFTWARE AND REFORMULATING RESOURCES ACCORDING TO CLASSIFICATIONS," Ser. No. 10/463,634, filed on the same day as the present application, and assigned to the same assignee, is incorporated herein by reference.

COPYRIGHT AUTHORIZATION

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

Modern structured development creates software functionality delivered as a set of executable files instead of single monolithic programs. Many of these files are resources such as dynamic linked libraries (e.g. DLLs). Grouping functionality into such resources allows building software that share the functionality. This allows defined groups of programmers to specialize in providing well-defined functionality quickly and correctly.

The boundaries that separate one DLL from another range from software engineering practices, abstraction and information hiding, domains of programmer's expertise, or developer group dynamics. For the sake of completeness, more functionality is often implemented in a shared resource library, than is used by any one client application.

SUMMARY OF THE INVENTION

The described technologies provide methods and systems for reformulating resources to contain nodes reachable from a set of entry points.

One example of a method or system provides an entry point, and a new resource name. The entry point is traversed to find nodes reachable from the entry point, and the new resource is created containing the reachable nodes. Formulating a resource based on reachable nodes provides memory and execution efficiencies.

In another example, a distribution list includes a new resource name, and plural entry points. The plural entry points are traversed to find reachable nodes. Nodes reachable from the plural entry points are placed in the new resource.

In another example, a distribution list includes plural new resource names, each with one or more associated entry points. The entry points associated with a new resource name are traversed to determine reachable nodes. Nodes reachable from entry points are placed in the associated new resource. In one such example, nodes are placed in new resources in a one way dependency relationship.

Additional features and advantages will be made apparent from the following detailed description, which proceeds with reference to the accompanying drawings.

BRIEF DESCRIPTION OF THE DRAWINGS

FIG. 11 is a block diagram showing a relationship between pre-reformulated and formulated resources.

FIG. 13 is a diagram showing how an import of an application is updated with new resource reference.

DETAILED DESCRIPTION

EXAMPLE 1

System Overview

Figure 1:
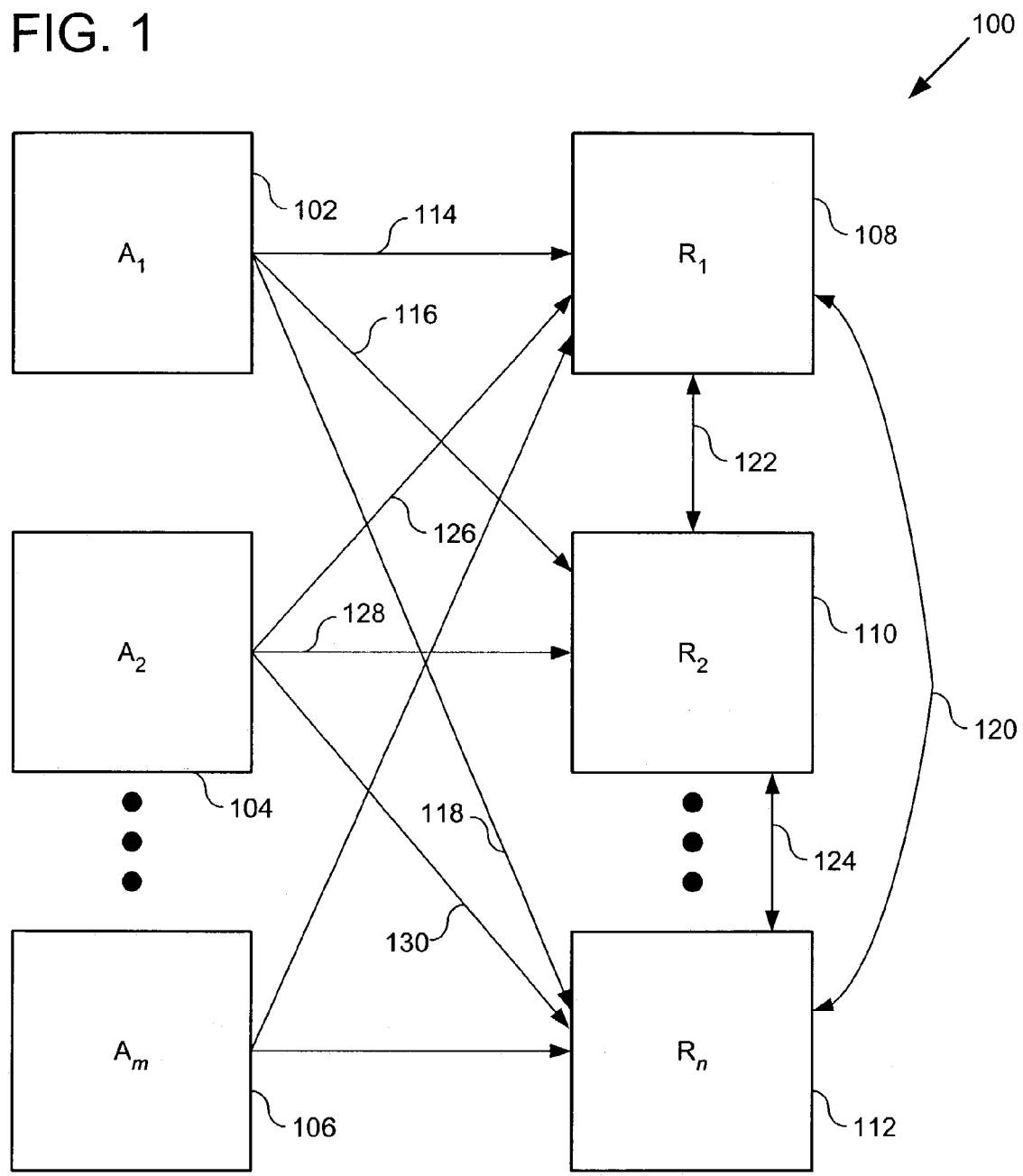
FIG. 1 is an exemplary block diagram showing an overview of a system with applications and shared resource dependencies.

FIG. 1 shows an overview of a system 100 with dependencies. In the modern computing environment, software files 102–112 are interdependent. For example, an application 102, often depends on other resources 114–118, to provide services. Additionally, those resources often rely on other resources 120–124 to provide services. For example, a word processing application 102 relies on 114 a resource 108 to support word processing. A resource 108, may rely on 120 another resource 112 to provide the requested service. For example, the word processor may be creating a document that includes a spreadsheet. The word processor uses a first resource 108 for library routines that handle textural graphical input information. Since the document may contain a spreadsheet, the resource 108 requests spreadsheet resources 112 in order to support a word processing service 114. In this example, the word processor 102 also uses graphical resources 110 to create a drawing. A graphical resource 110 often contains textual content and relies on a textual resource 108 for that purpose. Thus, the word processor 102 has several possible exit points 114–118, to other resources 108–112, respectively. Further, those resources may rely on other resources for providing requested services 120–124. Interestingly, these resources 108–112, often are organized along functional boundaries. For example, a programming development team familiar with text manipulation creates a library of functions 108 (e.g., a dynamically linked library), that can be utilized by other applications and other shared resources. Other programming teams create other libraries along functional boundaries, for example a drawing library 110 or a table library 112.

Each programming team develops their respective library 108–112, and exposes entry points to application programs 102–106, so application programmers can use the respective functionality. This delegation of human resources, based on functionality, allows application programmers to rely on services provided by experts in respective library groupings 108–112. Further, library developers are able to rely on functionality provided by other libraries 120–124. In this example, multiple applications 102–106, utilize various functionality provided by the respective libraries 108–112. In this example, when an application 102 is loaded into memory for execution, the application is examined to determine what resources it may rely on. In order to execute that application, these resources are typically loaded into virtual memory and made available in case the application 102–106 requests corresponding services 108–112. With this arrangement, exit points 114–118 from an application 102 require loading multiple libraries 108–112 into memory. Additional memory is required to hold these resources 108–112 in memory for the application 102. Further, the entire resource 108 is loaded into memory even though the application 102 may only require a small percentage of the services supported by the resource 108. Similarly, other resources 110–112 are loaded into memory to support the application 102, even though only a small percentage of the services in the resources may be utilized. In practice, it is not unusual to find that the combined services reachable by the application within all libraries 108–112 is smaller than the size of any individual library 108.

EXAMPLE 2

Architectural Overview

Figure 2:
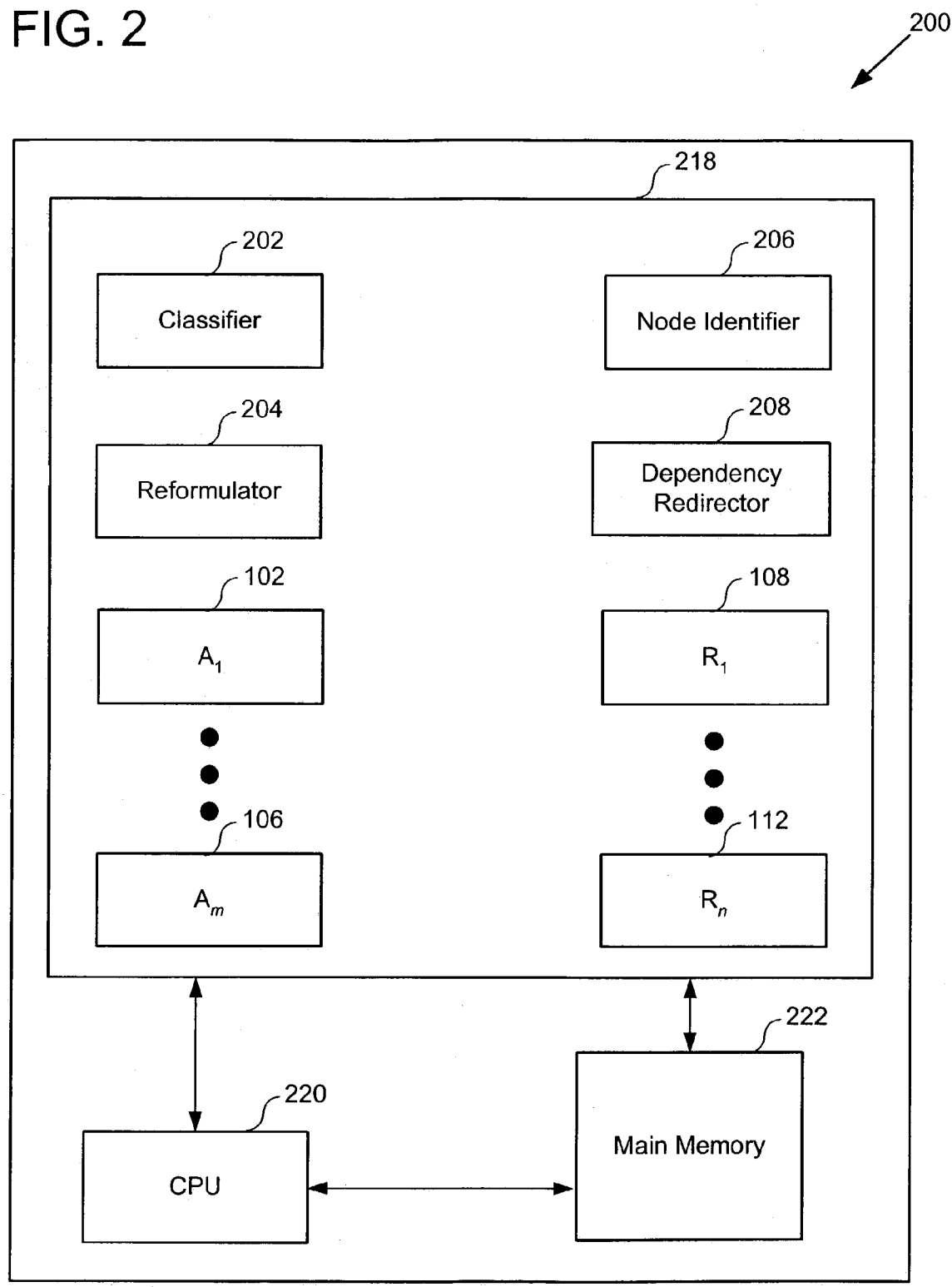
FIG. 2 is an exemplary block diagram showing an exemplary system for reformulating resources.
Figure 3:
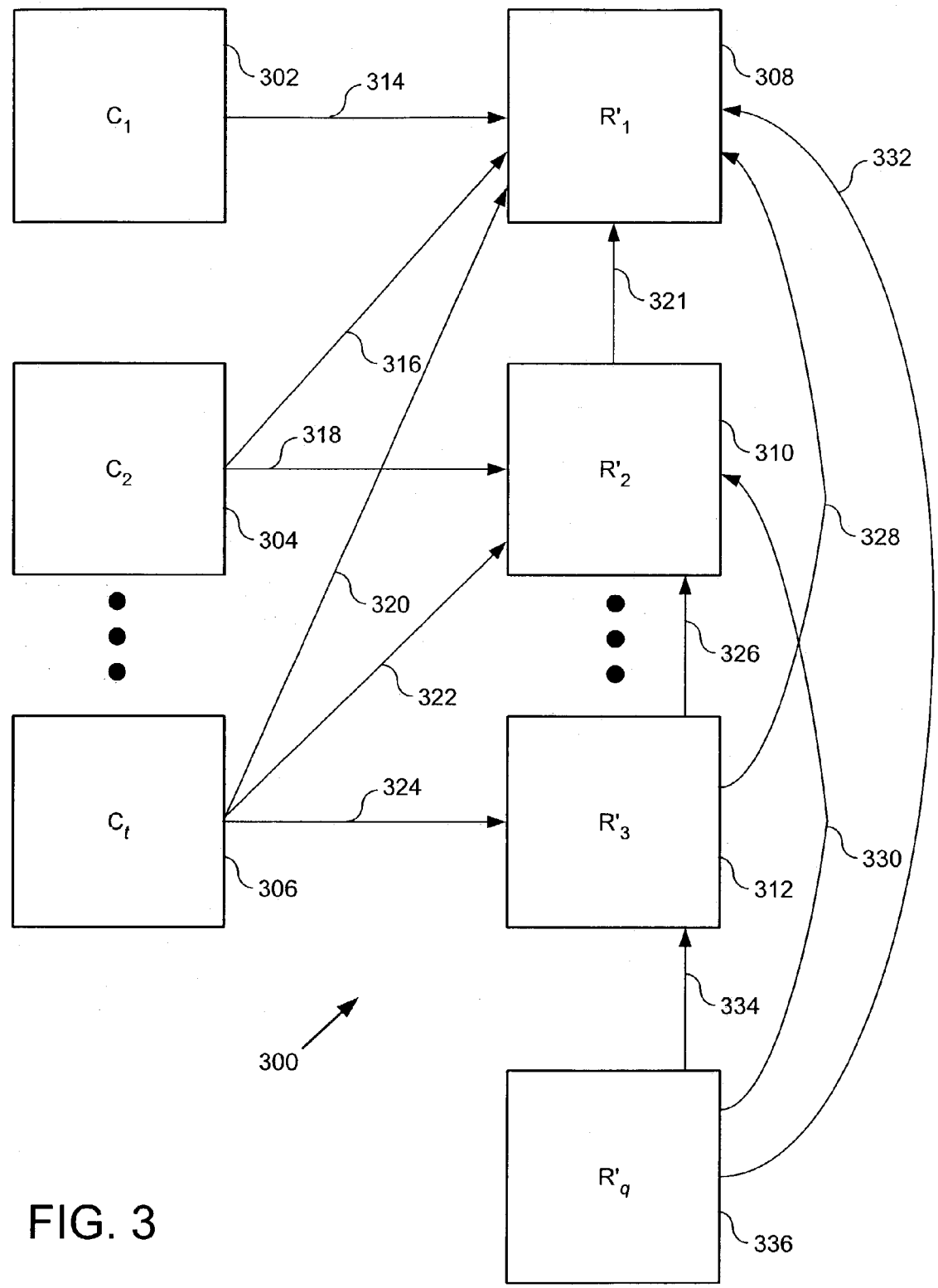
FIG. 3 is an exemplary block diagram showing an exemplary system with resources reformulated according to classified applications.

FIG. 2 shows an exemplary system 200 for reorganizing shared resources 108–112. The system comprises a classifier 202, a node identifier 206, a resource reformulator 204, and a dependency redirector 208, plural software programs 102–106, plural shared resources 108–112, a main memory 222, and a secondary memory 218. A processor 220 loads data and instructions from secondary storage 218 into main memory 222, and executes instructions performing the following. As shown in FIG. 3, the classifier 202 places software 102–106 into classifications 302–306. The highest priority classification 302 contains one or more software files (e.g., one or more applications). Thus, a "Class 1" classification 302 could contain a word processing application 102, and an email application 104. These one or more highest classified applications 302 may be determined by marketing decisions, frequency of use, or other methods. The classifier 202 prioritizes applications into two or more classifications 302–306, where each classification 302–306 contains one more software files (e.g., applications).

Additionally, the system 200 receives as input two or more resources 108–112. Starting with the one or more applications in the first classification 302, the node identifier 206 walks the control flow graph for each of the exit points 114–118 to the resources 108–112 respectively. For example, the node identifier 206 determines from an exit point 114 into a resource 108 a node within the resource 108 called by the software file 102. Often, the call 114 includes an identification of the resource and of the node within the resource 108. A node (e.g., basic block, procedure, object, etc.) is one or more instructions and/or data to the processor to perform services. The node identifier continues to walk the control flow from node to node from the exit point 114, through the resource 108 identifying any nodes within the resource 108 reachable from that exit point 114. Further, if any node within the resource 108, calls a node 110–112, the node identifier walks through any such resource identifying reachable nodes. Additionally, the node identifier 206 identifies other nodes in other resources 110–112 reachable 120–124 in the control flow graph.

The node identifier 206 identifies nodes reachable from the application 102 through any of the control flow paths accessed through the exit points 114–118 to the resources 108–112. Additionally, the node identifier identifies any nodes reachable by any node reachable within the control flow in any of the resources 108–112. Thus, the node identifier identifies any of the nodes which could potentially be accessed when executing the application 102.

The resource reformulator 204 assembles all of the reachable nodes in a new resource 308. With this arrangement 300, the one or more applications in the first classification 302, have a number of exit points 314 into a resource 308 that includes the universe of nodes reachable by those one or more applications 302. Assembling these services represented by the nodes in the new resource 308, makes them available from the single source 308. This way a highest order application has the services it may require available in one resource 308.

Finally, the dependency redirector 208 redirects the exit points 314 to the single resource 308 and redirects the edges between the nodes within the resource 308. Thus, nodes that directed edges to other resources now direct those edges to the nodes within the same resource 308.

The system 200 continues with the second highest one or more applications 304. For example, if a second application 104 was categorized in the second classification 304 the exit points from that application 126, 128, 130, are traversed by the node identifier 206. As before with the first class, all of the nodes reachable from the one or more second class applications are identified by the node identifier 206. Of course, the node identifier 206 by identifying all the nodes accessible by the one or more second class applications 304 may include nodes accessible by the first class one or more applications 302. The resource reformulator 204 determines which nodes are already located in the first resource 308, and places only nodes accessible by the second class one or more applications 304, that are not also accessible by the one or more first class applications 302, into the second resource 310. Thus, the first resource includes nodes accessible or reachable by the one or more first class applications 302. The second resource 310, includes nodes accessible by the one or more second class applications 304 that have not already been placed in the new first resource 308. This results in the condition that all nodes reachable by the second class one or more applications 304 are located at either the first resource 308 or the second resource 310. The dependency redirector 208 then redirects the entry points 316, 318 to the resource 308–310, respectively, where the corresponding nodes are located. Additionally, the dependency redirector 208 redirects 321 any of the nodes in the second resource 310, to nodes in the first resource 308, if they so depend. This results in a condition where a second class one or more application 304 requires only two resources 308, 310, in order to provide all of the services that are reachable by that one or more second class application 304. Finally, for a last classification for one or more applications 306, the exit points from those one or more applications are walked in order to determine the nodes reachable by those one or more applications. As before, the resource reformulator 204, reformulates any of the nodes reachable by the last class one or more applications 306, into a last resource 312, if those nodes are not already located in a higher order resource 308–310.

Finally, the dependency redirector 208 redirects the edges of the reachable nodes according to the new dependency locations of the resources 320–328. With the described system 200, applications with a highest order classification can execute with the fewest required number of resources in memory. Yet for lower frequency or less desirable applications the lower ordered resources 310–312, are available and loaded into memory at such times when they are less frequently needed.

Using the described scenario of classified applications, and nodes organized in new resources according to the classifications, three new resources have been produced 308–312. However, as previously discussed, the original resources 108–112 often contain more functionality than is required by any one application. In fact, it is not unusual to have nodes in the original resources 108–112, that have not been reachable by any of the classified applications 302–306.

Thus, if a non-classified application requests node(s) that were not reachable by the classified applications, those nodes are not available in the new resources 308–312.

Optionally, another new resource 336 is created to contain nodes unreachable by the classified applications. As later discussed with respect to FIG. 15, DLLs have export tables which include symbols representing entry points in the DLL. From these entry points in the original resources 108–112, the node identifier identifies nodes reachable from these entry points. For each entry point, the reachable nodes are located by the node identifier 206, and are checked by the reformulator 204, to see if they are already in an existing new resource 308–312. If the reachable nodes are not already in a new resource, they are placed in the heretofore unreachable node new resource 336. The dependency redirector 208 then redirects the edges of the unreachable nodes, according to the reachability from the entry points not accessed by the classified applications. For example, if a node reachable from an entry point not imported by a classified application reaches a node in a prior reachable resource 308–312, the edges are redirected to those reachable nodes 330, 332, 334. Further edges between unreachable nodes are maintained within the new resource 336.

Since, at the time of formulating this new unreachable resource 336, there is no known application requiring a change to its import table, forwarder DLLs are created to resolve the new location of the entry points not requested by classified applications (e.g., see the following discussions about forwarder DLLs). Thus, if an entry point into the new resource is later requested by an unclassified or unknown application, the forwarder DLL (not shown) will resolve the location of the entry point and its reachability graph, starting at the new resource 336.

EXAMPLE 3

Exemplary Method for Regrouping Resources

Figure 4:
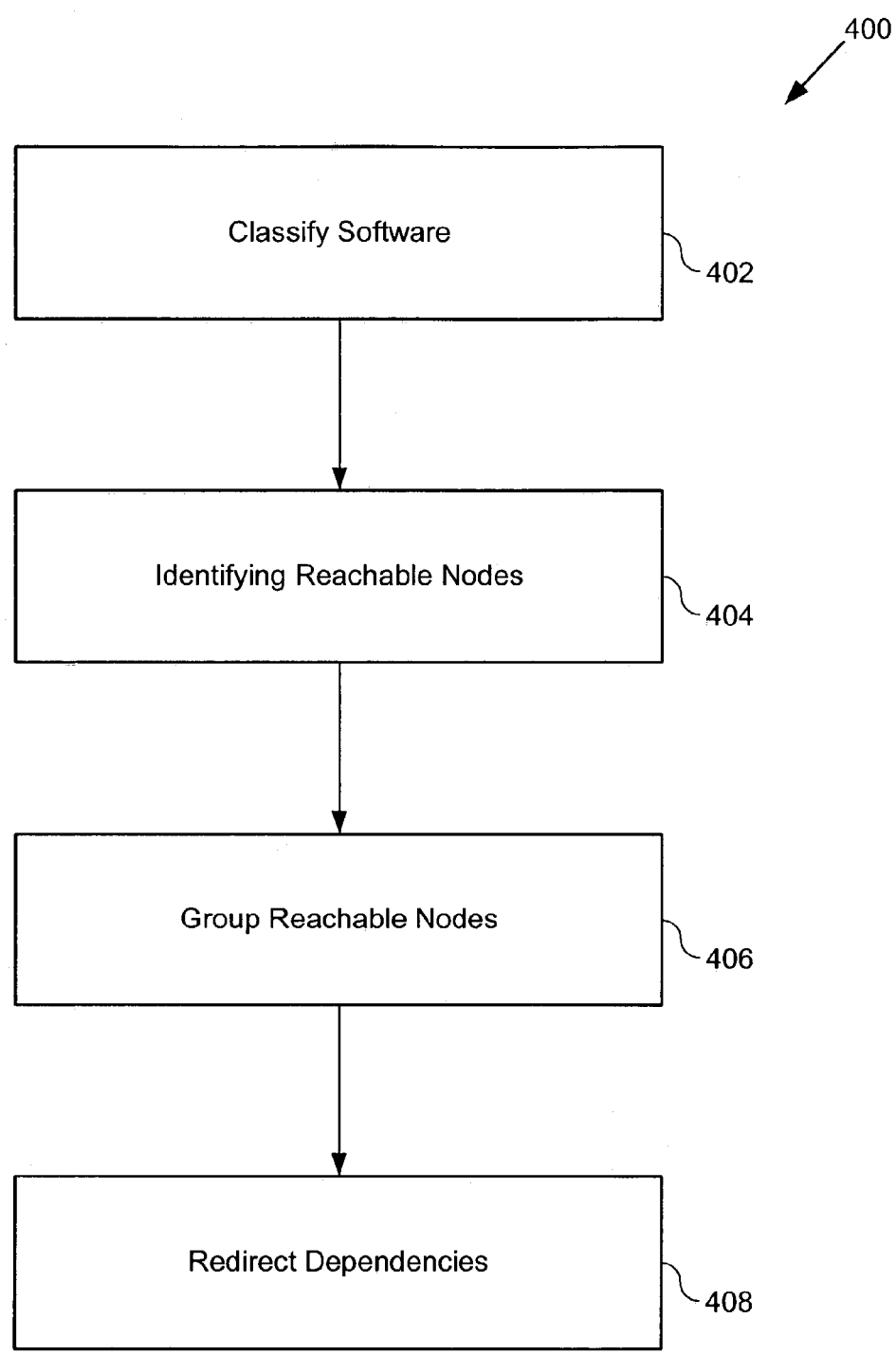
FIG. 4 is an exemplary flow chart for a method of regrouping resources according to classified software.

FIG. 4 is a flow chart 400 of an exemplary method for regrouping resources.

At 402, the method begins by classifying software. The classifications include at least a high order classification and a low order classification, and potentially multiple classifications ranking from higher to lower order classifications where each classification includes one or more software programs 302–306, where a software program could be an application program, or other software that uses a resource 108–112 such as a dynamic link library. For example, a shared resource could be a dynamic link library that is linked into the software program to provide shared resources to the software program.

Figure 5:
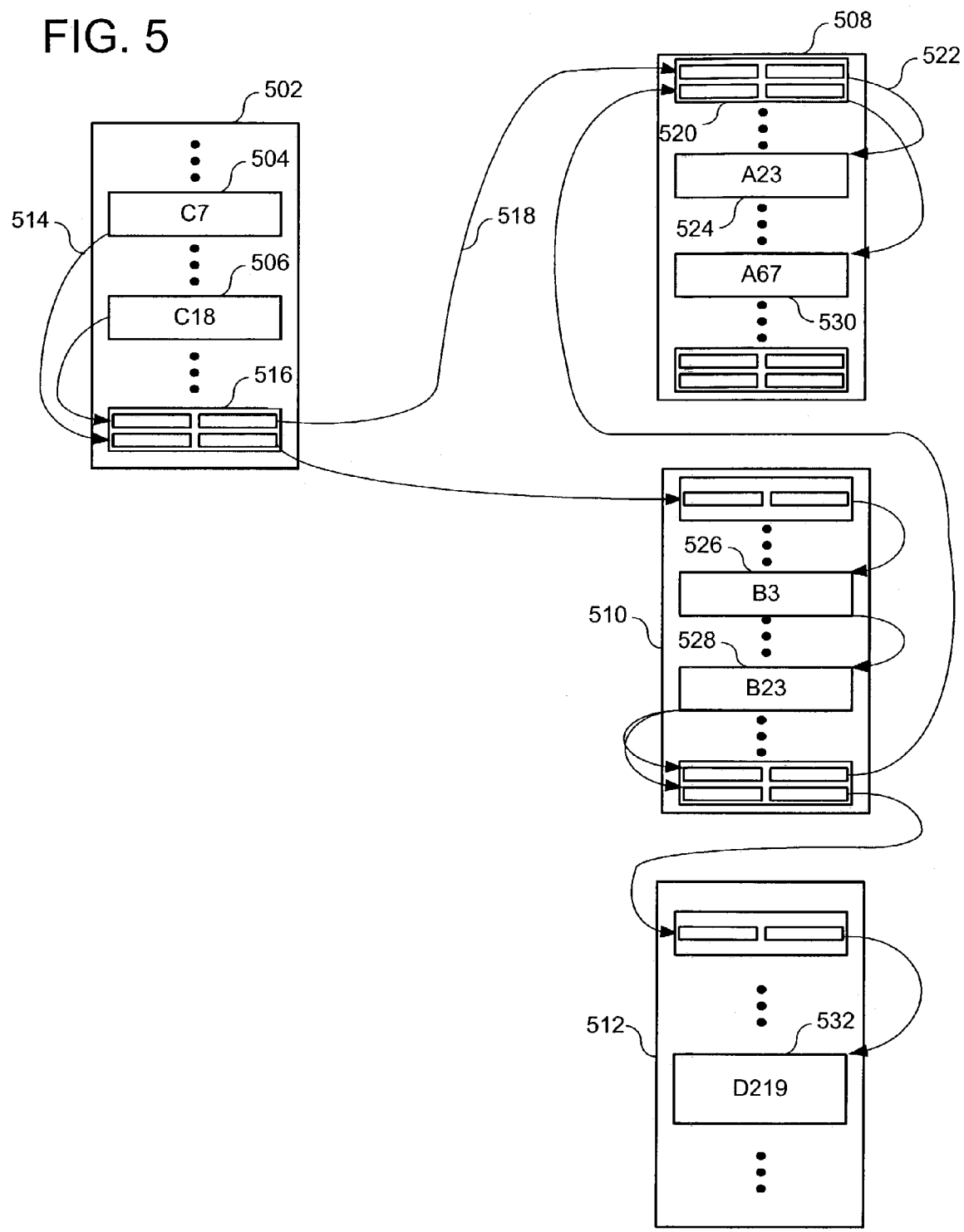
FIG. 5 is a diagram showing exemplary nodes reachable from a classified application.

At 404 the method identifies reachable nodes within the resources 108–112. For example, for a classified software program, the program has several exit points into services provided by the resources represented by nodes within those resources. When a software program calls a resource to obtain services, the call to that node within the resource is the beginning of a graph of potential nodes reachable through various control flow paths through the resources, and the method at 404 traces the call chain paths from the software program to the nodes within one or more of the resources, and creates a graph of nodes and edges. By chasing that call chain through the resources, nodes reachable through any path within the resources are identified. For example, as shown in FIG. 5, a software program 502 has two nodes 504–506 that requests services from the resources 508–512. For example, a node 504 within an application 502, requests a service 524 within a resource 508. Because the service 524 is in resource 508 separate from the application 502, specifically a shared resource, a call chain is in this case supported by an import 516 in the application 502 and an export 520 in the resource 508. The node 504 requesting the service 524 calls 514 a local import 516 in order to resolve 518 the resource location 522, within the resource 508. The export 520 is used to resolve 522 the location of the service 524. In this example, another node 506 within the application 502 requests services from another node 526 at another resource 510. Additionally, the node 526 provides the service utilizing another node, 528 at the resource 510. Finally, that node 528 provides the service 528 with help from two other possible nodes 530 and 532. Thus, when an application requests services, a call chain is walked to determine nodes within the resources 508–512 that provide services to the application 502. In this example, by walking the exit points in the application 502 it is determined that services are provided by nodes within three resources 508–512.

At step 406, the reachable nodes are grouped into a single resource.

Figure 6:
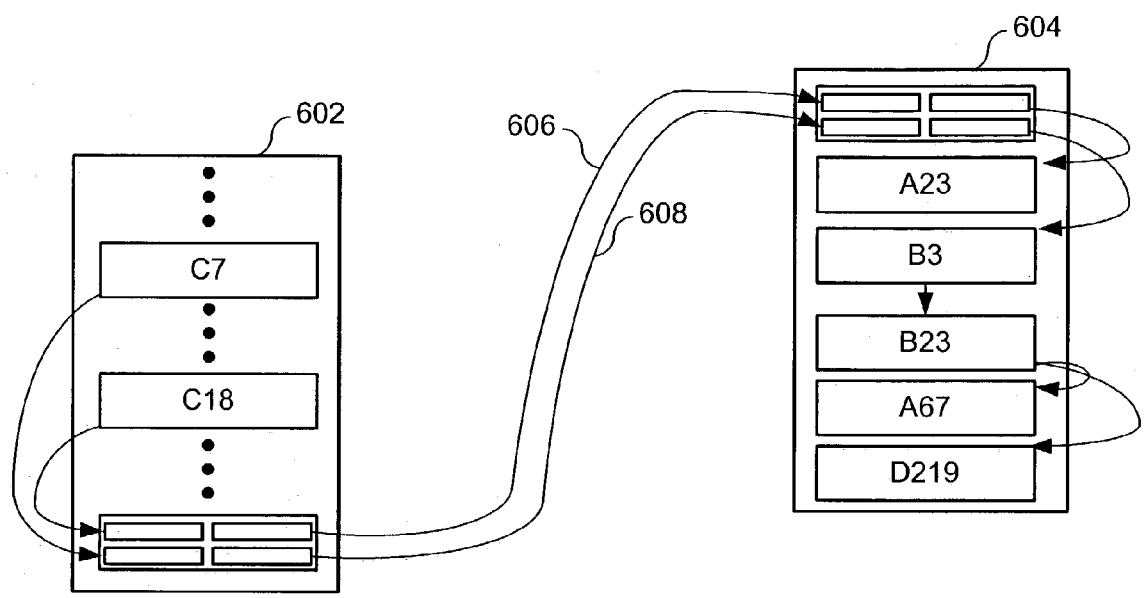
FIG. 6 is a diagram of a new resource formulated with nodes reachable from a classified application.

For example, from the import 516, of the application 502, a call chain is walked to identify nodes in the resources 508–512. These reachable nodes are then placed in a new resource as shown in FIG. 6. Thus, nodes from three old resources 508–512 are regrouped into a new resource 604.

In FIG. 5, the application 502 is the only application in the highest order classification. However, if multiple applications (not shown) were traversed in order to determine reachable nodes for all such multiple highest order classified applications, the nodes reachable by any of the highest order applications would be grouped into the new resource 604. The new single resource 604 could be a dynamic link library containing the nodes reachable by the highest order classified software programs.

Continuing with this example, in the new resource 604 we see the nodes reachable in the call chain as shown in FIG. 5.

Finally at 408, the edges between nodes are redirected in order to reflect the change in node dependencies within the single resource 604. Thus, the application is directed to receive the resources via a redirected call chain to nodes that have been regrouped in the new single resource 604.

Figure 7:
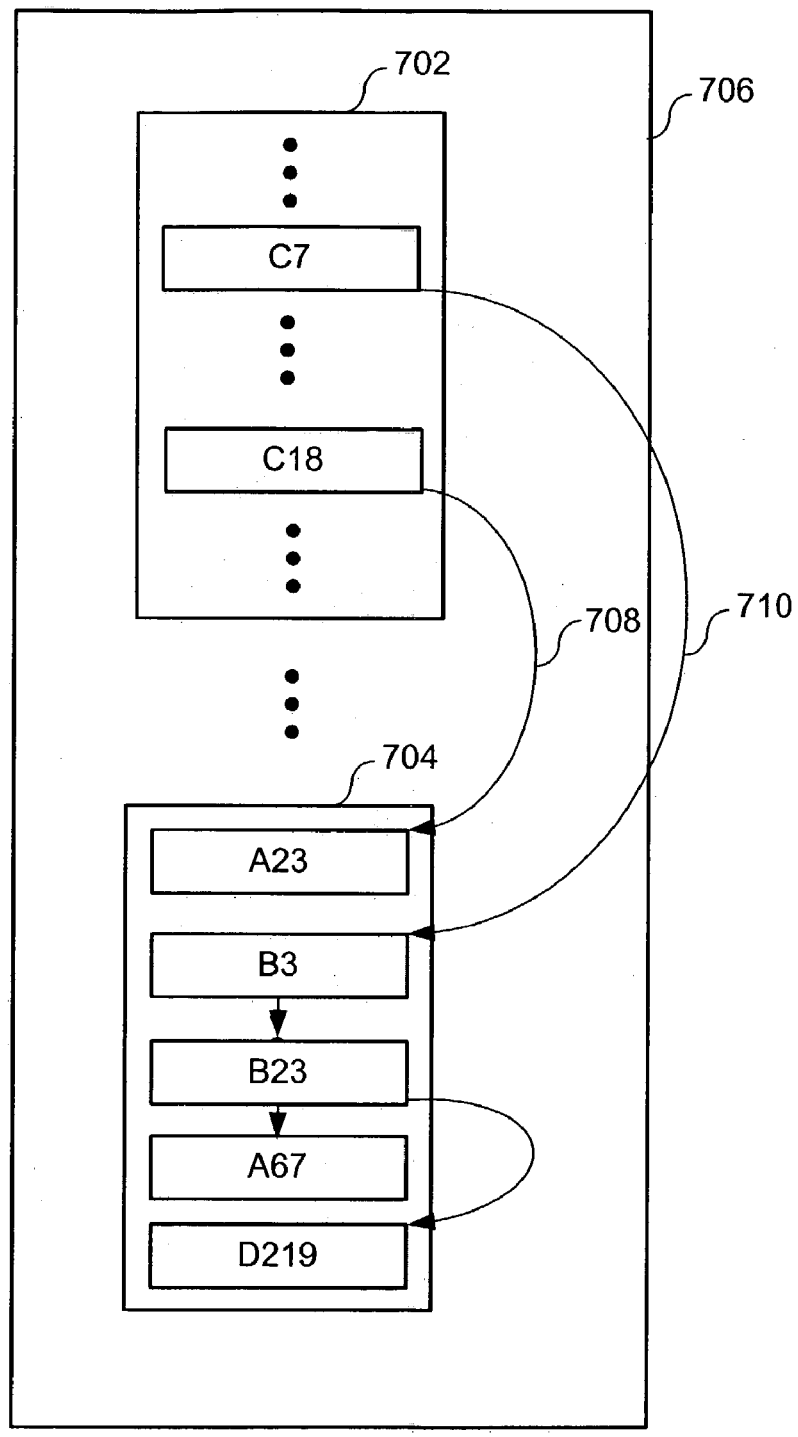
FIG. 7 is a block diagram of an application linked in memory to a reformulated resource.

As shown in FIG. 7, when the application 702 and the single resource 704 are later loaded into memory 706 for execution, depending on an implementation linking the application with the resource, the imports and exports may be de-referenced into direct memory links, if desirable 708–710.

The method at 404 would continue by selecting an application from the next lowest order classification and identifying nodes reachable from that application. Additionally, if two or more applications were in the second level classification the method 404 would identify reachable nodes from all one or more applications in the second classification and place those in a new resource (not shown). Any nodes that were already reached in the first classification analysis would already be in the first resource 604. Thus, the second resource would only contain those nodes reachable by the second order applications not already contained in the first resource. Similarly, for a third level classification the one or more applications are traversed in order to determine the nodes reachable. Nodes reachable by the third order applications would be placed in a third resource unless they have already been placed in the first resource or the second resource.

At 408, the call graph created to determine reachable nodes is used to redirect edges to the new node locations, thereby preserving the reachability relationships between nodes regardless of what new resource they are placed within. These relationships are understood with reference to FIG. 3. In FIG. 3, at 302, one or more first order applications rely on services in a first resource 308. Additionally, we see one or more applications 304 in the second order classification relying on services represented by nodes in the second resource 310, however, the nodes reachable by the second order application that were already regrouped in the first resource 308, are obtained by the second order applications directly 316, or indirectly 321, according to the reachability graph from the second order reachability analysis. This creates a condition where first order applications 302 have the services they need in the first resource 308, and the second order applications 304 have the resources they need in the first and second resources 308–310. Finally, the one or more applications in the final order classification 306 obtains the services it needs from a new resource 312 containing all the nodes reachable by the one or more applications in the last classification. As before, if any of the nodes reachable from the applications in the last classification 306, are contained in resources of higher order classification 308–310, the edges of those nodes are redirected 320, 322, 326, 328, 321, to the nodes in those higher order resources 308–310. Interestingly, this regrouping of services into new resources 308–312, creates a condition where a first order application 302 requires a single resource 308 containing the services it may request, whereas the second order application 304, requires the second order resource 310 and possibly the first resource 308, and a third order application 308, requires the third order resource, and possibly the second and/or first resources 308–310. In an example that prioritizes applications in classifications according to frequency of use, when first order applications are executing, fewer resources need to be maintained in memory, and the services within those resources are more tightly coupled and more likely to result in lower page thrashing and better memory optimization. Further, since lower order applications 304–306 are executing at a lower frequency, the requirements of multiple resources in memory at the same time 308–312 is reduced because of this lower frequency.

The resource arrangement of FIG. 1, requires multiple resources in memory even though very few services are used within any given resource 108–112. Whereas in FIG. 6, services from multiple resources have been grouped into a single resource, thereby reducing memory requirements for high order applications.

Software programs could be classified as first order applications based on other criteria. For example, a company could decide for marketing reasons that three or four of its applications are the most valuable in terms of sales volume, and place the services required by those applications, into a single resource. This would allow for efficient utilization of memory for programs most desirable to the company. Similarly, applications with lower sales volume may be classified lower.

Finally, the method 400, could be shipped in software with the programs and resources, and execute periodically in order to determine frequency of application use at a particular client site. Based on frequency of use or other factors, the programs that are most valuable to a specific client, are periodically determined at the client site transparent to the user. After a periodic determination, resources are regrouped to provide services within resources based on the clients' use. Of course, the method could also be used by development teams before the software is shipped in order to regroup services into resources based on classification rather than the original grouping of resources that was based on development team functionality.

Finally, the method could be used to examine source code in order to create a make file that directs a build to contain dynamic link libraries built according to the method. The nodes would be grouped according to reachability in the source code instead of the binary code and the redirect dependencies step 408, would not be necessary since the build would create the DLLs originally in the desired format. Thus, the method is useful pre-build, post-build, and post-release.

EXAMPLE 4

Exemplary Universe of Software Programs and Share Resources

Figure 8:
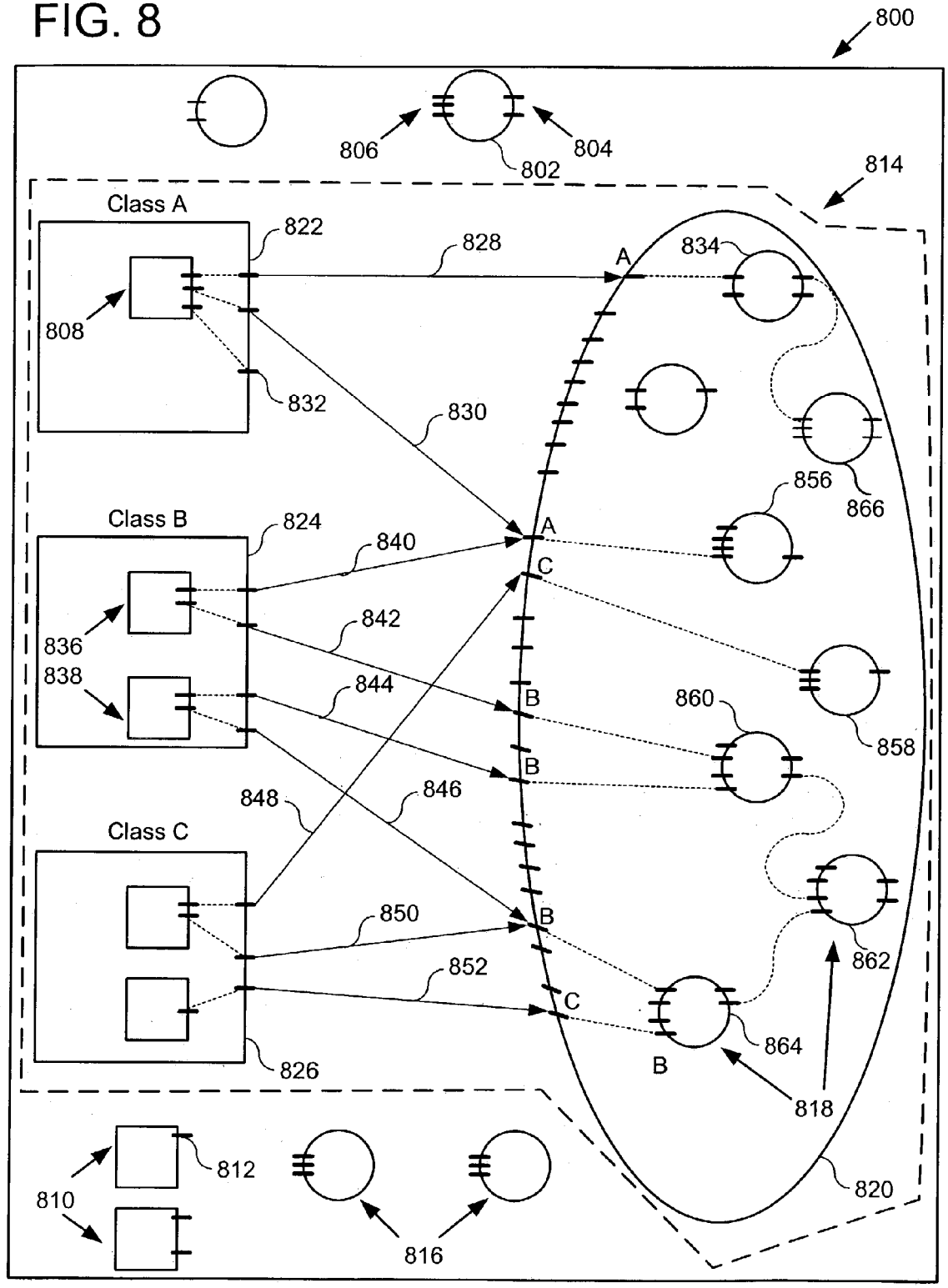
FIG. 8 is a diagram of an input universe of classified applications and pre-reformulation resources.

FIG. 8 is an exemplary universe of software programs and the shared resources they use. The universe 800 includes resources (e.g., 802) represented by circles with entry points 806 and exit points 804. The universe also includes software programs (e.g., 808–810) represented by squares, and the software programs include exit points 812. In one example, a method receives all of the software programs and resources within the universe 800 as input (e.g., .exes, .dlls, etc., in the memory of the computer system). In another example, a method receives a subset 814 of the universe as input. For a method that receives a subset 814 of the universe 800 as input, resources and software programs will exist inside the input 814 and resources and/or software programs will exist outside the input 810, 816.

EXAMPLE 5

Figure 9:
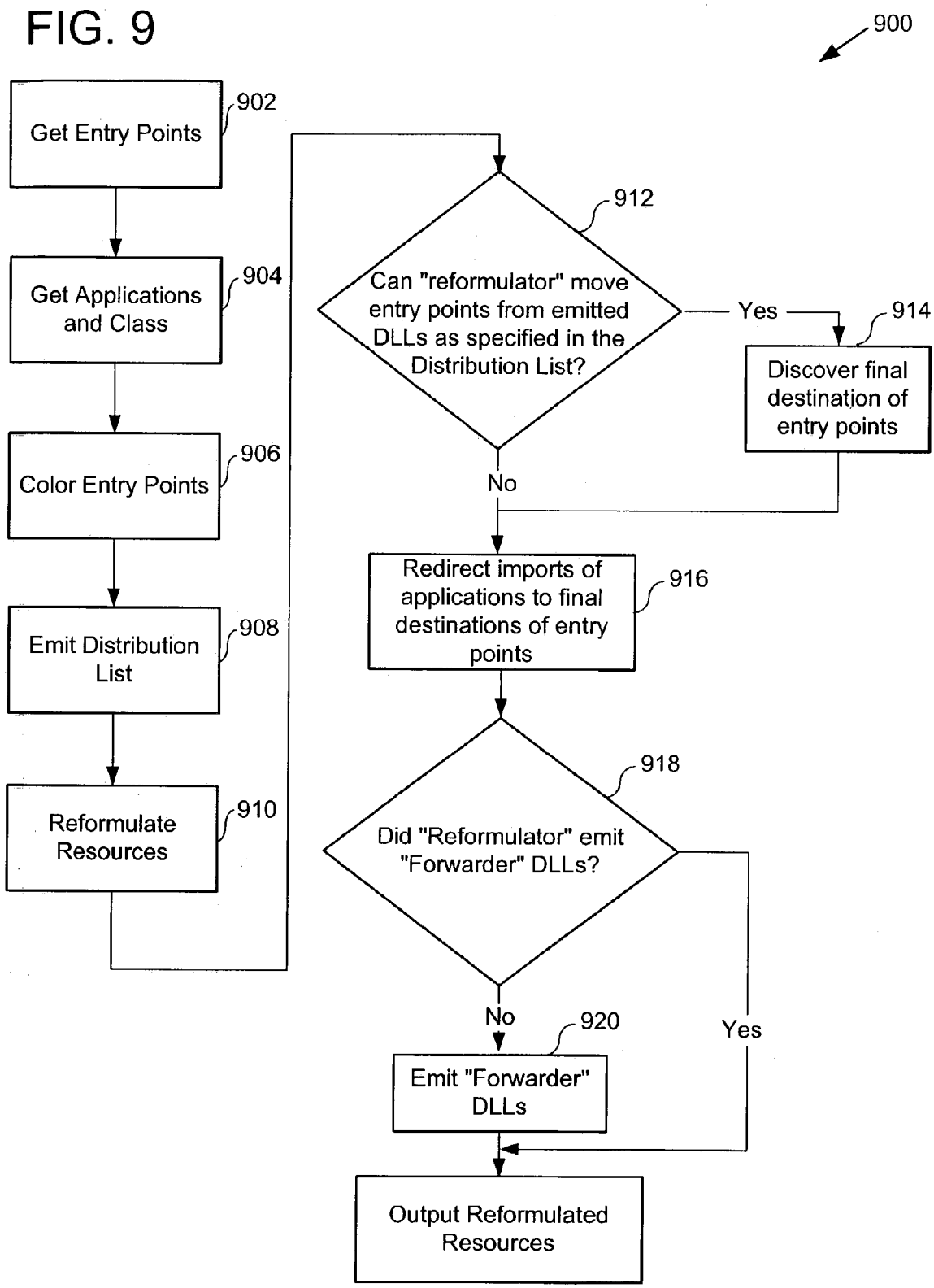
FIG. 9 is a flow chart of an exemplary method for prioritizing applications and reorganizing shared libraries according to the prioritizations.

Exemplary Method for Prioritizing Applications and Reorganizing Dynamic Link Libraries FIG. 9 is a flow chart 900 of an exemplary method for classifying applications and reorganizing dynamic link libraries according to the classified applications. Method 900 is a specific example of technologies described herein, but this specific example should not limit the scope of the technologies. In this example, the software programs have been compiled into application programs and the resources have been compiled into dynamic link libraries. Since the resources are compiled into dynamic link libraries along functional lines, the applications may only use a small percentage of the functionality in a given resource. Thus, the exit points from the applications are traversed in order to determine the services within the resources so those services can be regrouped into new resources based on classes of applications as will be discussed. In this example, the applications and the dynamic link libraries are binary files.

At 902, the method gets the entry points from each of the dynamic link libraries in the input. For example, as shown in FIG. 8, dynamic link libraries 820 within the input 814 are considered. The method collects the entry points from each of the dynamic link libraries and assembles them. The notches on the left side of the oval 820 represents the assembly of the entry points of the dynamic link libraries contained in the input 814. For example, each of the dashes representing an entry point on the left side of the oval 820 is stored in a data structure holding an identification of a dynamic link library for that entry point and an entry point within the dynamic link library.

At 904, the method determines or receives applications within the input 814. The method 904 then classifies the applications within the input. For example, a graphical interface displays a list or icons of programs available for prioritization. Using such a provided interface, the user could select the input universe of applications for prioritization 814. Further, using a graphical user interface the user could classify the selected applications in a priority order. As shown in FIG. 8 one or more applications 822 are classified as a Class A or highest priority application, one or more applications are classified 824 as a Class B or second order priority application, and finally one or more applications are classified 826 as a Class C or third order priority application 826. Thus, in the method 904, applications are selected and classified for resource prioritization.

At 906, the method colors the entry points to the dynamic link libraries in the input universe 820. For example, for the one or more applications classified in high order 822, if the application has an import, corresponding 828 to an export in the input universe, that export is colored with the high order classification (e.g., A). As shown, the Class A application 808 has an import corresponding to an export 828 in the input universe corresponding with an export in a DLL 834. Thus, the entry point 828 is colored with the high order classification "A" as shown. Additionally, since the application 808 has an import corresponding to another export 830 that export is colored with the high order classification "A". Finally, as shown the application 808 has an import 832 to a DLL not in the input universe and, thus, has no corresponding export in the input universe. Once all applications in the Class A classification 822, have had entry points colored with Class A, the method 906 begins with the classification B applications 824. In this example, the Class B classification 824 contains two applications 836, 838. As before, for imports with a corresponding export in the input universe, an entry point is colored 840–846 with the second order classification B. Notice that an import from classification "A" 830 and an import from classification "B" 840 both correspond to an entry point in the input universe. In such cases when a high order classification and lower order classification both have imports corresponding to an export in the import universe 830, 840, the high order classification colors the export. In this case, the export is marked with the "A" classification. Finally, the lowest ordered classification are applications colored with the low order classification C 848–852. As before since an export has a corresponding import from two classifications 846–850, the high order classification colors that entry point (e.g., B). Thus, the method 906 colors the entry points in the input universe 820, according to the classifications of the applications that have imports corresponding to the exports in the input universe.

Figure 10:
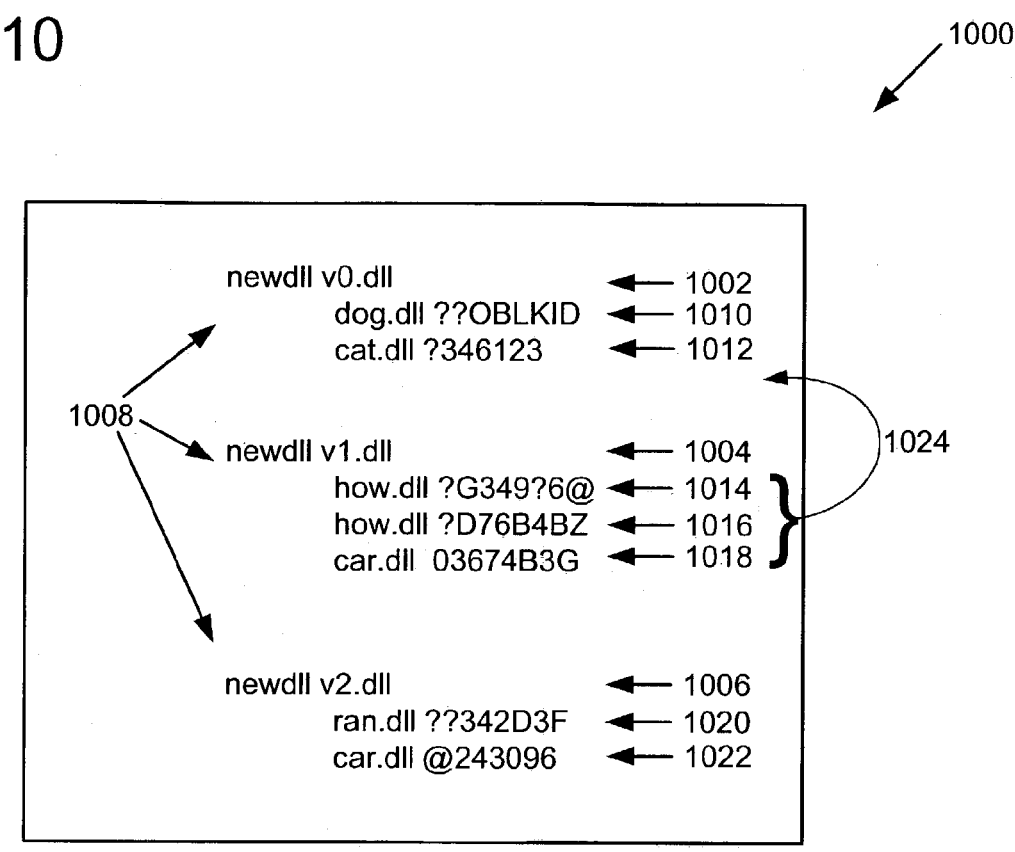
FIG. 10 is an example distribution list.

At 908 the method emits a distribution list. For example, as shown in FIG. 10, a distribution list 1000 includes the names of the new binary files (e.g., DLLs) 1002–1006. In this example, a keyword 1008 signals the name of the new resources. The keyword signals that the highest order resource 1002 is named V0.DLL, the second highest order 1004 new resource is named V1.DLL and the third and last resource 1006 is named V2.DLL. In the highest order, resource 1002, two entry points were identified 828, 830, the first in a DLL 834 called DOG.DLL. In this example, the export is know within the DOG.DLL with a unique symbol 1010. The second entry point is from a DLL 856, called CAT.DLL, and contains the unique symbol 1012. In this example, the second highest order new resource will be named V1.DLL 1004. The second highest order application(s) 824 had four imports 840–846. However, one of those imports 840 was in common with the higher order new resource 830. Since that entry point is in the higher classification it will not also be in the V1.DLL resource. Thus, the second highest order new resource will contain three exports, two from one DLL 860 and another from one DLL 864. This is reflected in the distribution list with the DLL names and unique symbols 1014–1018. Finally, the lowest order new resource DLL named V2.DLL 1006, contains the exports from two DLLS in the input universe 858, 864. The first DLL 858 is named RAN.DLL and contains the unique symbol 1020 as an import and second DLL 864, named CAR.DLL contains the unique symbol 1022 for the export. Again, we see that an export 850 from a higher order resource 846 is in common with the export 850 from a lower order resource, so that export 1018 is contained in the higher order resource 1004. Thus, the method 908 has created a distribution list showing the names of the new resource DLLs 1002–1006 and the entry points into those DLLs 1010–1022.

At 910, for each new resource 1002, 1004, 1006, a reformulator is run to determine the nodes reachable for the corresponding exported entry points into the original DLLs 834, 856, 866, 860, 862, 864, 858. For example, the new resource V0.DLL 1002, will contain all nodes reachable from the exported entry point into the DOG.DLL 1010, and all nodes reachable from the exported entry points into the CAT.DLL 1012. For example, as shown with reference to FIG. 11, the export from the DOG.DLL 1010, is shown as an entry 1010 into the DOG.DLL 834. From this entry point into DOG.DLL 1010, all nodes reachable from the entry point are traced through the DLLs and identified. In this case, control flow starting at one node in DOG.DLL and going to a second node in DOG.DLL and exiting DOG.DLL and entering another DLL 866 called FAR, and entering a third node. Thus, these three nodes 1, 2, and 3 (and the accompanying path(s) through the control flow), will be included in the new resource V0.DLL 1002. Additionally, from the identified unique export into the CAT.DLL 1012, we see an entry point into the CAT.DLL 856 in FIG. 11 at 1012. In this example, only one node is reached. Thus, the new V0.DLL. 1002, contains the nodes encircled as shown in FIG. 11 at 1102. Next, for the second classification resource V1.DLL 1004, the trace beings at three entry points 1014, 1016, and 1018. The first entry point 1014 includes one node, and the second entry point 1016, includes two nodes that are reachable. The first is in the HOW.DLL 860, which imports a node from the NOW.DLL 862, which is shown as "4" in the NOW.DLL. The third entry point 1018, includes the node shown as "3" in the CAR.DLL 864. The new resource V1.DLL 1004, will include the four nodes reachable as shown encircled 1104. Finally, in the lowest order classification V2.DLL 1006, two nodes are reachable from the entry point 1020, the first in CAR.DLL 864 marked as "1" and the second in NOW.DLL 862, marked as "2". From the second entry point 1022, two nodes are reachable in the RAN.DLL 858, marked "3" and "4". Thus, the new resource V2.DLL 1006, contains the encircled nodes 1106.

During reformulation 910, the method collects reachable nodes according to imports of the classified applications. Reformulation 910 completes by outputting DLLs with the regrouped nodes. The new V0.DLL resource 1002 contains the nodes encircled by 1102, the new V1.DLL resource 1004, contains the nodes encircled by 1104, and the new V2.DLL resource 1006, contains the nodes encircled by 1106.

Figure 12:
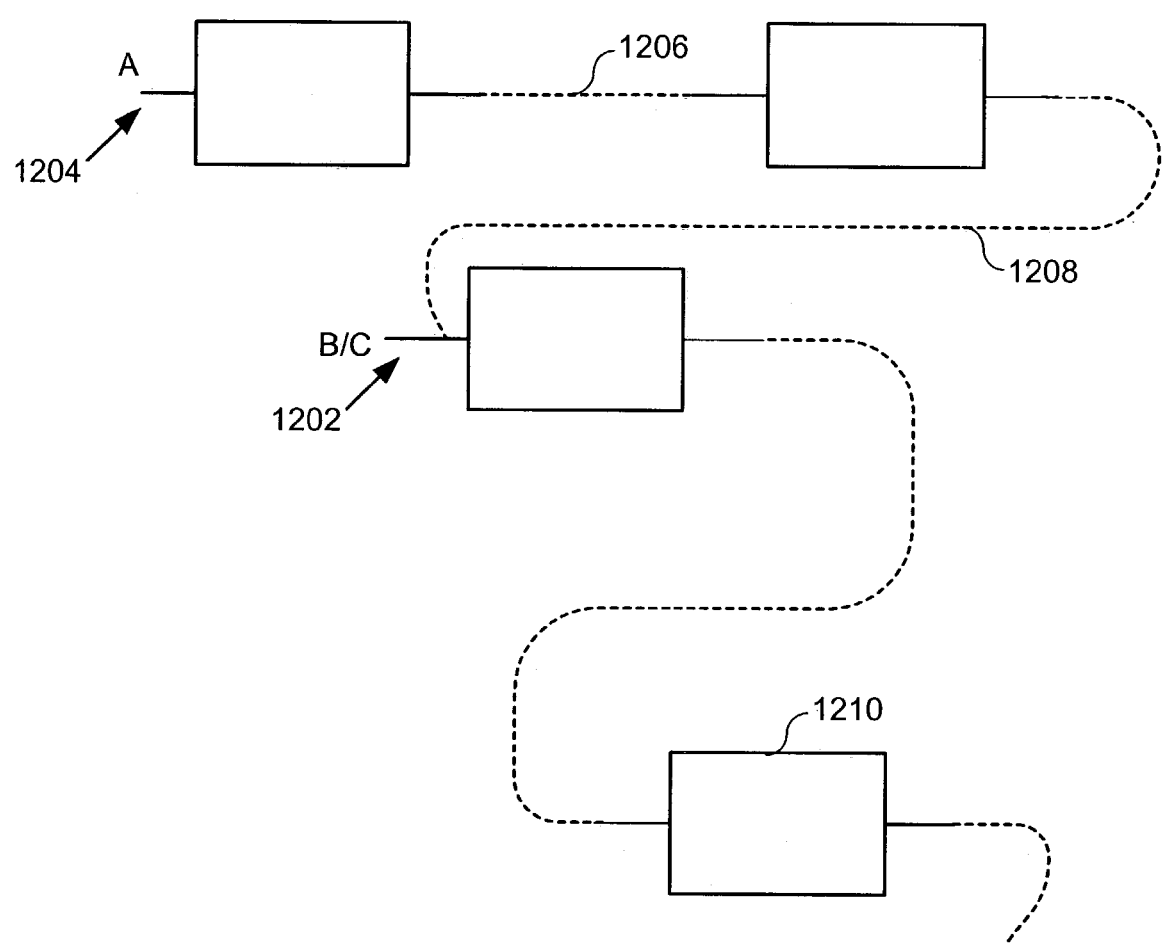
FIG. 12 is a basic block trace showing how entry points are moved to higher classifications.

At 912, if the reformulator can move entry points 1024, then an output of the reformulator, can include a changed distribution list showing the final destination of entry points. For example, with reference to FIG. 12, a DLL entry point 1202 may first be classified as an export in a lower classification (e.g., B or C). However, during traversing the reachable nodes from a higher order entry point 1204, a call chain of reachability 1206, 1208, may determine that the entry point 1202 is reachable by the high order classification entry point 1204. In such an example, it is desirable to have the entry point of the lower order 1202, included in the new resource of the higher order. For a reformulator 910 that can move entry points, the lower order entry point 1202 is moved into the higher order resource, along with the nodes 1210 reachable by that entry point 1202. For example, if FIG. 10 represented an admitted distribution list according to step 908, a reformulator output could include an output distribution list indicating that an entry point (e.g., one or more entry points, 1014), was moved to a higher order resource 1024, such as V0.DLL 1002. Thus, if a reformulator can move entry points 912, then the method 914 would output the final resting point or destination of that moved entry point.

At 916, the method redirects imports of the application to the final destination of entry points. For example, as shown with reference to FIG. 13, an application 1302 shows a node within that application 1304 requesting a resource 1308 via an import table 1306. The import table indicates an identifier of a new source DLL 1310 and a unique symbol identifiable within that new resource DLL. When the application is loaded into memory the linker locates the DLL 1310, and loads the DLL 1314 into memory. The unique identifier 1312 is identifiable 1318 in the export table 1316, and identifies the corresponding location 1320 within the new resource DLL 1314 where the service is located 1322. Of course, the particular import and export table and linking mechanism will vary according to the operating system and linker. So this is only exemplary in nature.

Figure 14:
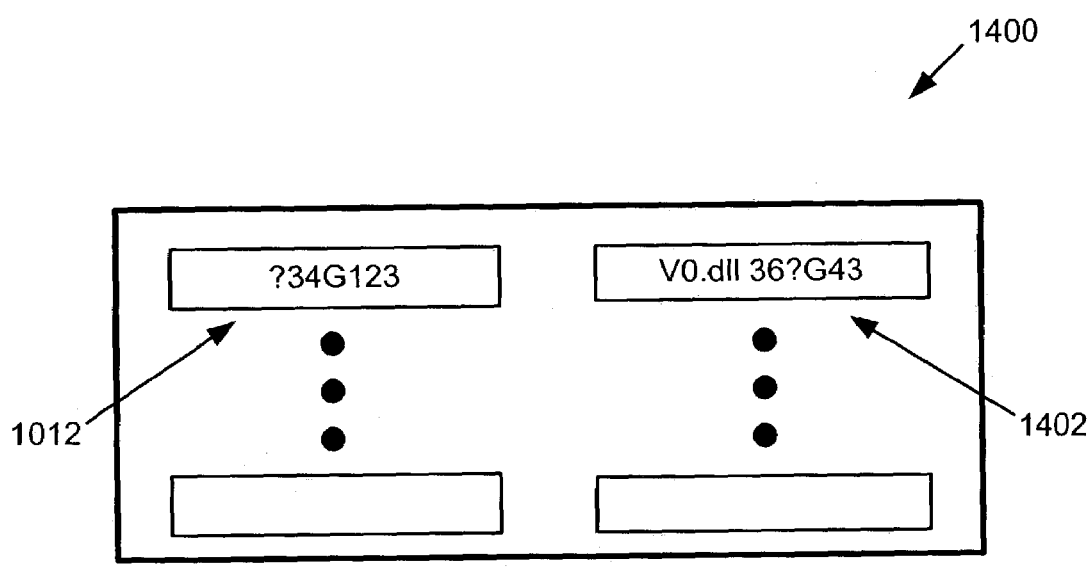
FIG. 14 is a diagram of an exemplary forwarder that resolves requests for old resources to new resources.

At 918, the method determines whether the reformulator created forwarder DLLs. For example, as shown in FIG. 14, a CAT.DLL 1400, contains the original unique symbol for the entry point 1012, and also the corresponding new resource DLL and entry point into that new resource 1402. A forwarder DLL is useful for many purposes. For example, in FIG. 13, an example was shown where an application 1302 had its import table updated to reflect the new location of the service within a resource 1310–1312. However, if the import tables of an application are not updated, the forwarder DLL 1400 would be obtained by the operating system at link time since it would still be the reference from the import table of an unchanged application. In such an example, the reference to the new resource 1402 would be used to obtain the location of the service within that resource. However, forwarders 1400 have other purposes. For example, with respect to FIG. 8, two applications 810 were not in the input universe 814. In such a case, one of those applications 810, may still refer to a DLL called CAT.DLL even though its services have been dispersed into new resources. In such a case, even though other applications within the universe 814 have had their import tables 1306 changed to reflect the new imports 1310, 1312, the applications that have not been so changed 810 will still reference resources by the pre-reformulation names (e.g., 834, 866, 856, etc.). Thus, forwarder DLLs 1400 can be used to redirect imports for applications within the input universe 814, without changing their import tables.

They may also be used by applications outside the input universe that still refer to the reformulated resources according to their pre-reformulation names. Thus, at 918 the determination is made whether a specific example of a reformulator 910 created forwarder DLLs 918. If the reformulator created forwarded DLLs, then the method exits, however, if the reformulator had not created forwarded DLLs, then at 920, the forwarder DLLs are created as required.

EXAMPLE 6

Exemplary Qualities of New Resources

FIG. 11 is a diagram showing nodes reachable from the various classifications of applications A, B, and C. Classification A contains nodes encircled by 1102, Classification B contains nodes encircled by 1104, and Classification C contains the nodes encircled by 1106. In one example, copies of these nodes can be made to create the new resources. For example, the nodes encircled by 1102 become the new resource V0.DLL which could contain copies of nodes 1, 2, 3, and 4, as shown in 1102. By changing the import tables of the applications so they refer to the new resources 1102, 1104, 1106, the new copies of the nodes and their corresponding resources would be obtained, instead of the nodes in the old resources 834, 866, 865. Yet, the old resources would still be available for applications that have not had their import tables changed. However, in a case when all applications in the universe have been classified and all control paths placed in new resources, any of the old DLLs might just be deleted.

The CAT.DLL 856, has a node reachable from the entry point 1012, marked as 4. However, the new resources combined 1102, 1104, 1106, contain none of the other nodes reachable in the CAT.DLL 856. In another example, the reformulator could trace all of the entry points into the CAT.DLL 856, in order to identify all of the nodes reachable by those entry points, even though none of the classified applications access those entry points. In one example, the reformulator could put all of the reachable nodes that were not already in the previous new resources into a final new resource in case an application that was not in the input universe later tries to access one of those entry points. Thus, the reformulator would have resources including the entry points into the DLLs from the classified applications and another new resource for entry points not accessed by the classified applications. This would be another way of maintaining all of the nodes in the DLLs even if they are not accessed by classified applications. If a non-classified application is later added to the system or already exists in the system, if it needed any of these unused nodes, it would access that additional new resource containing the unused nodes. This would be an alternative example of a reformulator that saves the uncolored nodes instead of throwing them away.

While the reachability trees are created from the starting entry points into the DLLs, the edges in that reachability tree are kept during reformulation, so that the edges in the new resource follow the same reachability tree. For example, in FIG. 5, a reachability tree spanning three DLLs 508, 510, 512 is reformulated into a reachability tree with the same edges in a new resource DLL 604.

As shown in FIG. 3, the first order classification applications 302 have all of the services they need 314 in a single resource 308. Notice also that a second ordered classification application 304, has entry points 318 into a second order new resource 310. That second order resource 304 may also have an entry point into the higher order resource as shown in FIG. 8 at 840, and FIG. 3 at 316. Thus, the second new resource 310 includes entry points into DLLs and the nodes reachable there from in a reachability tree, or graph. However, notice also that if while traversing that second classification reachability graph, a node is reached 321 that was reachable from a first order classification entry point, the edge from the second order classification graph refers to the node in the first order classification graph. Thus, nodes in the first classification resource 308 may also receive edges from lower order classifications 321, 328, but notice that none of the first order classification reachable nodes have edges into a lower order classification. This creates the dependency conditions evident in FIG. 3, wherein graph edges go from lower order classifications to higher order classification but not vice versa. Thus, while traversing a lower order reachability graph, if a node is reached that is already classified or colored in a higher order classification, an edge is produced into the higher order resource. Thus, the reformulator tracks these relationships while traversing the reachability graphs. Later, it will be shown how import and export tables are created between the new resources 308, 310, 312, in order to reflect these one-way dependencies. Finally, for clarification purposes, if a node from a low order classification enters a higher order classification and that node or a subsequent node in that reachability chain accesses a node in a lower order classification, all nodes reachable from that higher order node are already in the reachability graph of the higher order classification and would therefore appear in the higher order resource.

EXAMPLE 7

Exemplary Method for Obtaining Entry Points into Resources

Figure 15:
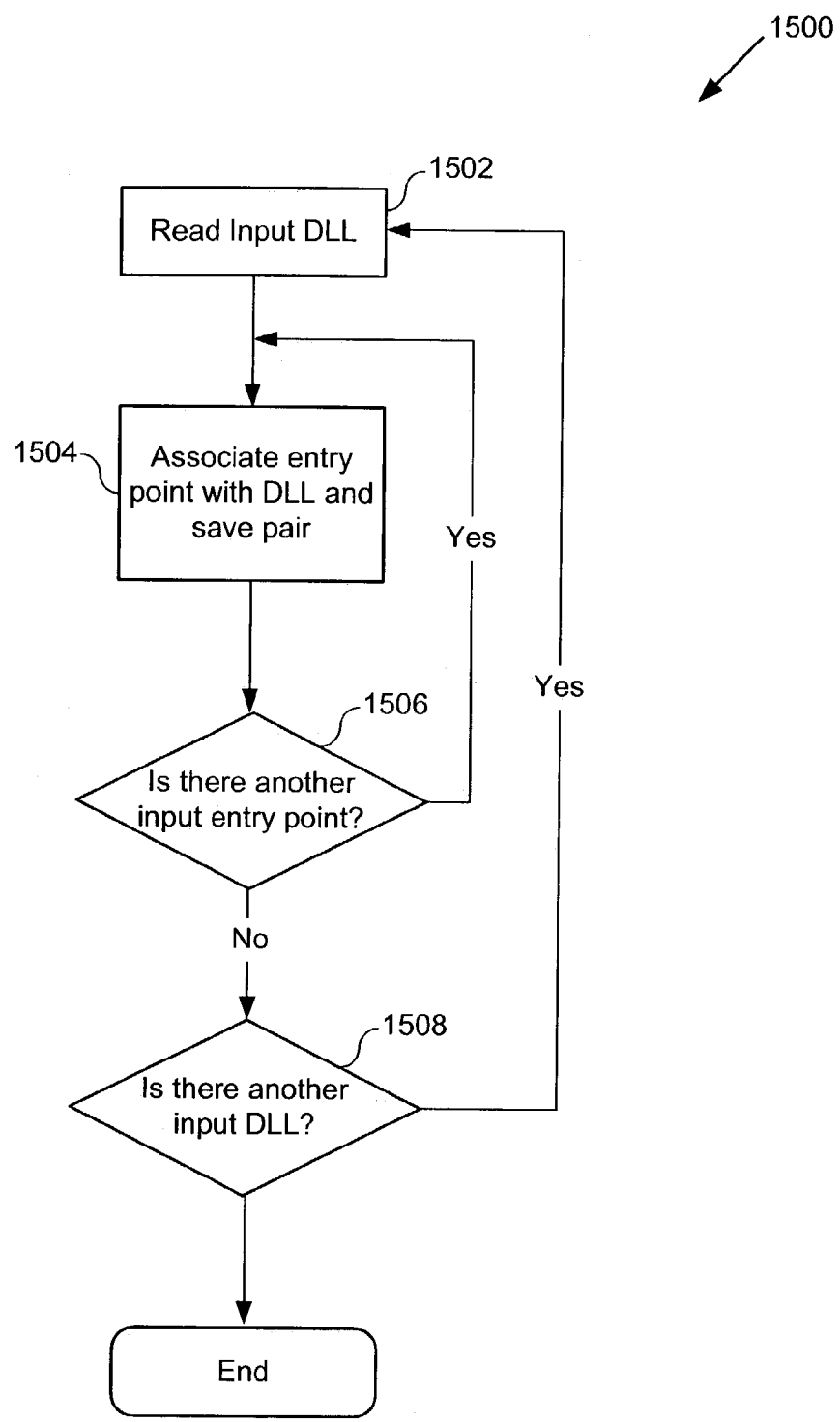
FIG. 15 is a flow chart of an exemplary method for obtaining entry points.

FIG. 15 is a flow chart 1500 of an exemplary method for obtaining entry points into resources.

At 1502, the method obtains a first DLL in the input universe, and reads the DLL in order to determine entry points into the DLL. For example, a DLL includes an export table which includes unique symbols representing entry points in the DLL and associated with each unique symbol, a location in the DLL where the entry point node begins.

At 1504, the method associates each discovered entry point with the DLL it is contained in and saves the association.

At 1506, the method continues associating entry points within the DLL with that DLL in pairs, so long as there are additional entry points.

At 1508, once the entry points have been determined and associated within the DLL, the method obtains another DLL in the input universe and begins again to read that DLL to obtain its entry points. Once all of the entry points in each DLL have been associated with that DLL, and once entry points have been determined for DLLs in the input universe, the method exits. Thus, a data structure or other format for holding data is created that associates each entry point with its associated DLL.

For example, the method 1500 is one example of a way to perform step 902 in FIG. 9.

EXAMPLE 8

Exemplary Method for Obtaining Applications and Associated Class

Figure 16:
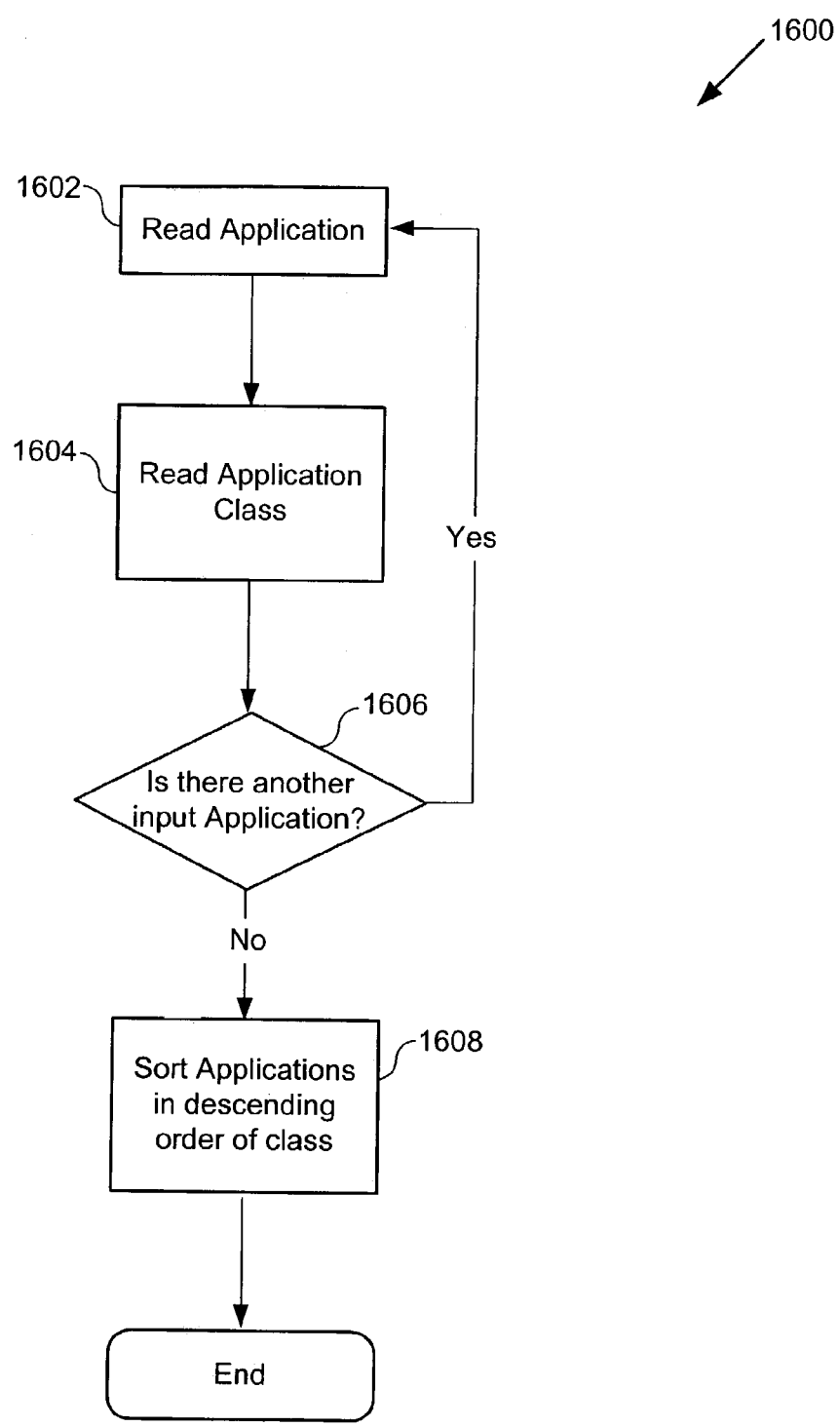
FIG. 16 is a flow chart of an exemplary method for determining classified applications.

FIG. 16 is a flow chart 1600 of an exemplary method for determining applications in the input universe and for determining the class of an application in the input universe.

At 1602, an application is identified in the input universe. For example, the input universe could be received as a textural file input listing applications and classifications. In another example, a graphical user interface could display a list of applications or icons identifying applications that may be selected for the input universe.

At 1604, applications are assigned a classification. For example, an input file could identify a classification for applications in the input universe, or a graphical user interface could display an application in the input universe, and display a graphical feature for selecting a classification for the application.

At 1606, the method continues until all of the applications in the input universe have been determined and classified.

At 1608, the applications are sorted based on their classification. In another example, the method-runs periodically and automatically on a workstation, or on a network. In one such example, the method measures the frequency of application use over the period and at the end of the period, applications are selected automatically 1602, if they are used for some threshold determination of time. Further, in such an example, applications can be assigned classes 1604, based on the length or frequency of use of the application during the period. In such a case, the workstation or network automatically classifies applications on a periodic basis. Then the classified applications are input into a method of reformulating the resources according to the classifications. This creates an ongoing, dynamic, and specific reformulation of resources.

Thus, the method 1600 can be used statically through a file input or graphical interface, or dynamically and transparent to workstation operators in order to reorganize resources.

FIG. 16 is an example of a way to obtain applications and classifications as discussed in FIG. 9 at step 904.

EXAMPLE 9

Exemplary Method for Coloring Entry Points into Resources

Figure 17:
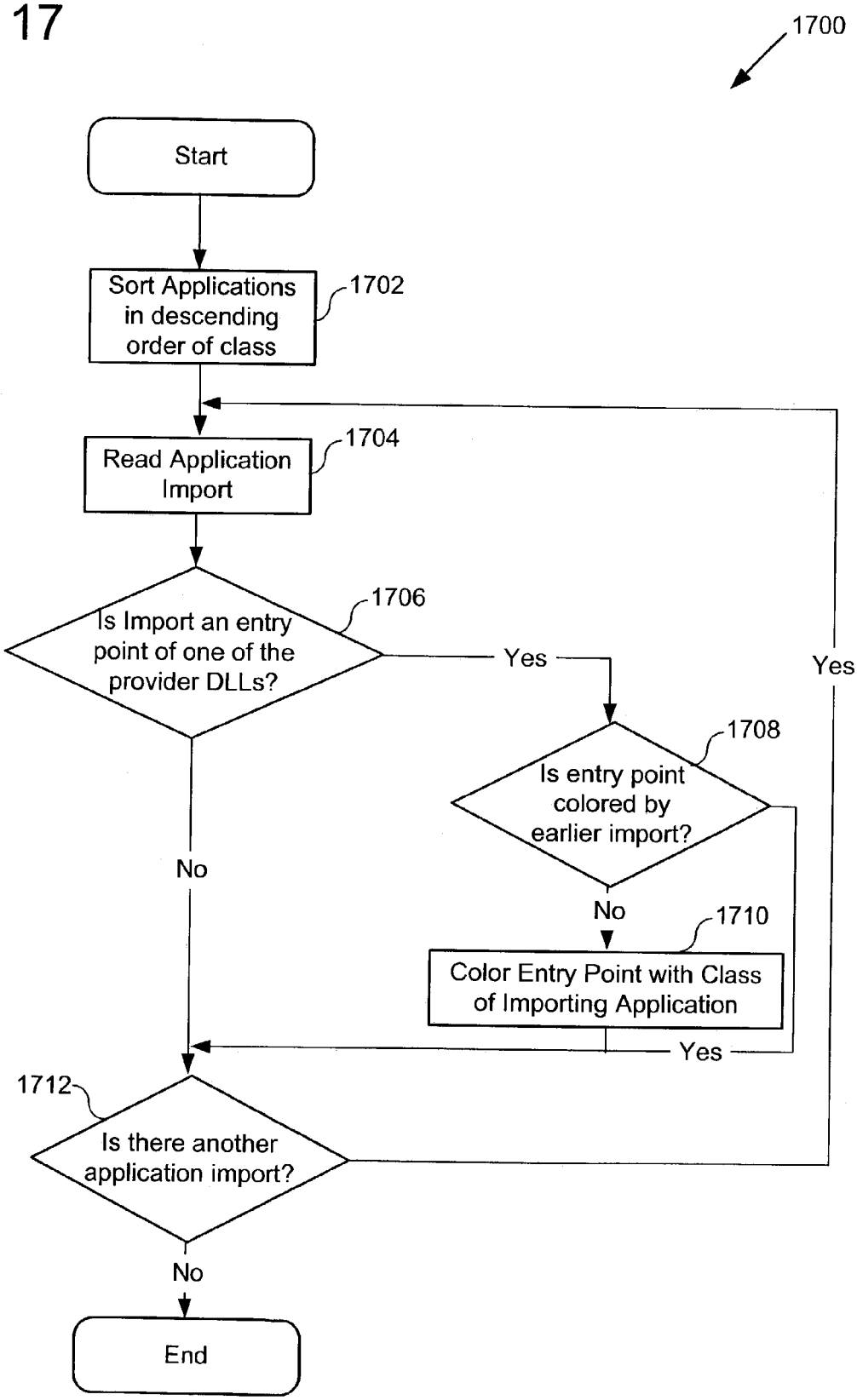
FIG. 17 is a flow chart of an exemplary method for determining imports of classified applications.

FIG. 17 is a flowchart 1700 of an exemplary method for coloring entry points into resources. For example, a highest order resource entry point can be colored with a color indicating the highest classification. Additional colors are used to represent the levels of classification. However, classifications can similarly be assigned letters or numbers indicating levels of classification. Further, the order of new resources in the distribution list can indicate levels of classifications from highest to lowest based on order in the list (e.g., 1002, 1004, 1006).

At 1702, the method sorts applications into order of classification. Each classification can have one or more applications and applications with the same classification are ordered together in that classification.

At 1704, the method reads the application imports.

At 1706, the method determines whether or not an import entry is for a DLL in the input universe. If a DLL is in the input universe, at 1708 the method checks to determine whether or not that entry point has already been colored or classified earlier in a higher order classification.

At 1710, if that entry point has not been colored by a higher order classification, then it is colored with the classification of this application.

If the entry is not in the universe 1706, is already colored by a higher order classification 1708, or is colored with the classification of this application 1710, the method continues at 1712.

At 1712, if there is another application import, the method returns to read that imports at 1704. Once imports in all applications have been checked, the method 1700 is completed.

Once the method is complete 1700, all imports in the applications in the input universe have been checked to determine whether or not they correspond to entry points into resources in the input universe. Entry points into DDLs in the input universe are colored with the classification of the application containing the import. If an import is included in two or more applications, that import is given the classification of the highest order application.

The method 1700, represents an example way of performing the functionality discussed in FIG. 9 at step 906.

EXAMPLE 10

Exemplary Method for Creating Distribution List

Figure 18:
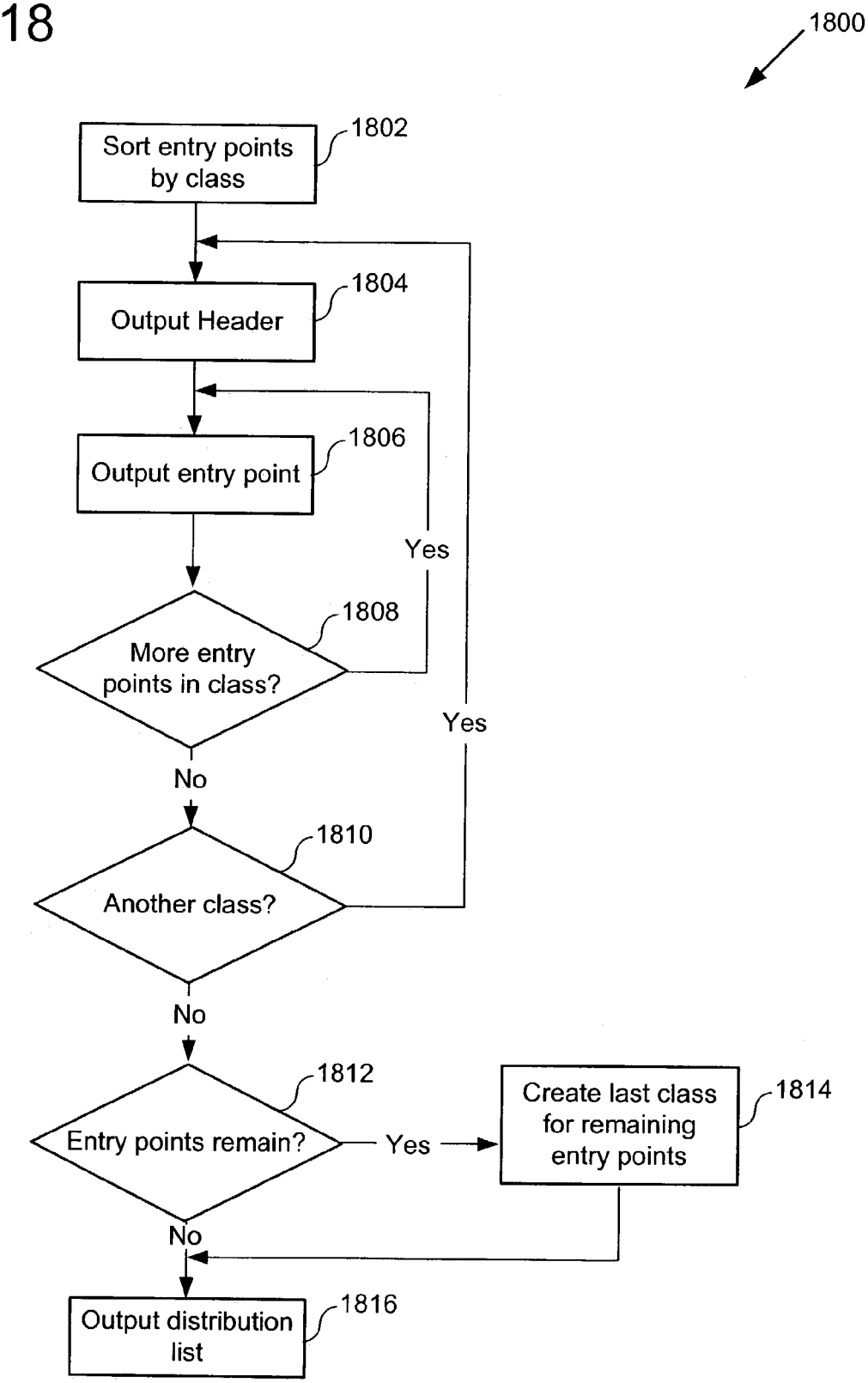
FIG. 18 is a flow chart of an exemplary method for creating a new distribution list.

FIG. 18 is a flowchart 1800 of an exemplary method for creating a new resource distribution list.

At 1802, the colored or classified entry points are sorted into classes.

At 1804, a header is output into the distribution list for the highest order class. The header, for example, identifies a name for the new resource (e.g., V0.DLL), and optionally, a preferred starting address for the DLL in memory (not shown). This address if present will be the preferred address when the new resource is loaded into main memory for execution.

At 1806, under the header for the new resource V0.DLL, the entry points for the first order classification are listed. For example, the list would include the name or symbol identifying the DLL of the old resource and then the name or symbol of reentry point into that old resource. So long as there remains more entry points 1808, those entry points are added to the list 1806. This completes the entry points that will go into the V0.DLL new resource.

At 1810, if another classification exists, the method returns to output a header 1804, for that additional classification. As before, the entry points into the old resources are listed under the header 1806 so long as more entry points 1808 exist. The method continues outputting a new classification and listing the entry points 1810 until all classes have been added to the distribution list.

At 1812, once all classified or colored entry points are included in the distribution list, any entry points remaining in the input universe, regardless of the original source DLL, are listed under a final class 1814. Thus, all classified entry points are created in the new resources and unclassified entry points in the input universe are included in a final class at 1814. Optionally, unclassified entry points are discarded.

At 1816, since all classified and unclassified entry points are included in the distribution list, the distribution list is output and can be used by a reformulator.

This distribution list created with the method 1800 assumes that a reformulator can walk the entry points to determine the reachability graphs for the multiple new resources. Thus, this distribution list includes the starting points for the reachability graphs. For example, a first classification entry point includes the starting point of a reachability graph for the first classification and the reformulator walks from that entry point down the reachability path to all reachable nodes, thereby building a graph of reachability. All reachable nodes from first order entry points are included in the first order resource. Of course, the name of the resources could be changed so long as there is an understanding of which is the first order resource (e.g., V0.DLL, V1,DLL is not required).

However, in another example, the reformulator requires all the nodes reachable from each entry point as input and thus those reachable nodes will be listed in the distribution list. Such a reformulator will then handle the task of creating the new resource, since the distribution list will include a list of the reachable nodes.

FIG. 18 is an example way to provide functionality discussed at FIG. 9 at step 908.

EXAMPLE 11

Exemplary Method for Creating a Distribution List Including Reachable Nodes

Figure 19:
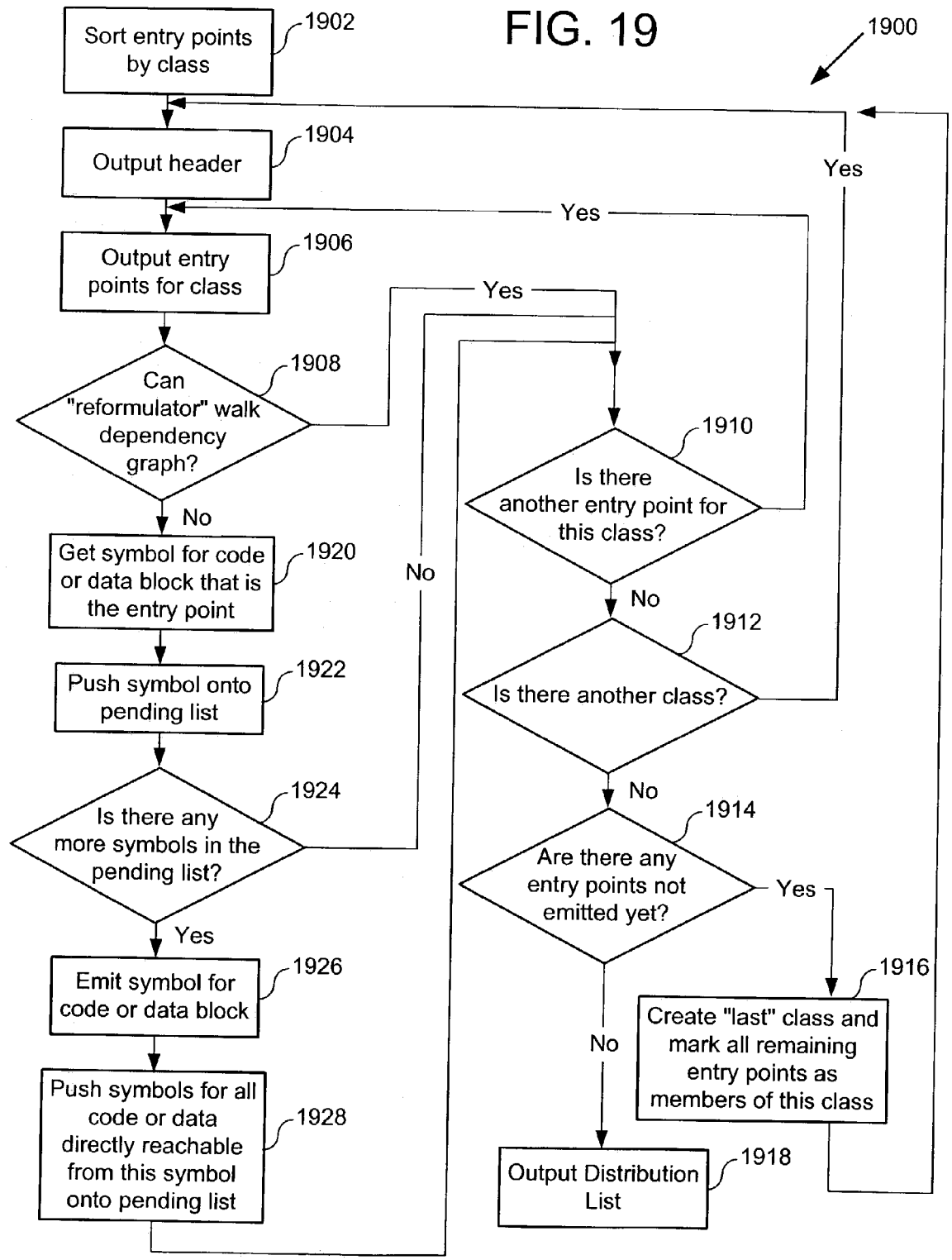
FIG. 19 a flow chart of an exemplary method of creating a new distribution list for a reformulator that optionally is able to determine reachable nodes.

FIG. 19 is a flowchart 1900 of another exemplary method for creating a distribution list including reachable nodes.

At 1902, the method sorts the entry points according to the color classification of that entry point.

At 1904, a header is output for the high order classification. For example, the header could include a key word (e.g., "newslice", "newdll", etc.) identifying the name of the new resource and the corresponding name for the new resource (e.g., V0.DLL).

At 1906, for each entry point colored with the classification for that header, that entry point is listed under the header. For example, the listing for that entry point includes the name or symbol of the old DLL containing the entry point, and the name or symbol identifying that entry point uniquely within the DLL.

At 1908, if the reformulator is able to create the reachability graphs, then the distribution list only needs to contain the entry points for the new resource. In that case, as long as there is another entry point in the present classification 1910, the method continues to add those entry points under the classification 1906. Once all entry points have been entered under the header for a given classification and there are no remaining entry points 1910, then the method 1912 determines whether there are any other classifications for the distribution list. If there is another classification 1912, the method returns to add another header line for that classification 1904, for example, V1.DLL. Again, the header may also include a key word signaling that the new resource name is for a new resource. As before, the new header may also include a requested or recommended memory address for the new resource. As before, for this new header, each of the entry points 1906 identifying entry points into the old DLLs, are listed. Once all entry points 910 for each class 912, have been added to the distribution list, the method continues at 1914.

At 914, any entry points in the input universe of DLLs, not yet included in the distribution lists, are listed under a final or last class 1916. As before, the last class includes a header 1904 and each of the listed entry points where they can be obtained in the old resource including an identifiable symbol 1906. At this point 1918, all classes have been added to the distribution list along with entry points into the old resources.

FIG. 19 represents an example of how to provide the functionality described in FIG. 9 at step 908.

FIG. 19 also includes steps for walking the reachability dependency graph for the entry points. This is useful when the reformulator is unable to perform reachability analysis.

At 1908, since the reformulator is unable to walk the dependency graph, that information is determined as follows.

At 1920, the symbol or name for the code or data block that is the entry point is obtained from the entry point 1906, and it is pushed onto a pending list at 1922. In this case, since a symbol was just pushed onto the pending list, there are more symbols 1924, in the pending list.

At 1926, the symbol on the pending list is put below the header for the classification currently in processing.

At 1928, all symbols for all code or data directly reachable from the symbol is put into the pending list.

At 1920, so long as there are other entry points for this class, those entry points are placed under the header information 1906 for this class 1904. Further, the symbol is obtained 1910 and pushed onto the pending list 1924. So long as more symbols appear in the pending list 1924, those symbols are added to the distribution list 1926 and the symbols reachable by those symbols are pushed onto the pending list 1928. Thus, all entry points are put under the classification header 1904 for this class 1906, and all symbols reachable there from continue to be pushed onto the pending list 1928, in order to obtain all reachable nodes from reachable nodes. Once there are no more entry points in this class 1910, and no more nodes reachable there from in the pending list 1924, then there are no more nodes reachable from entry points within this class.

At 1912, the method determines whether there is another class, and the method continues for the next class to omit a header and entry points 1904, 1906 and then to obtain the symbols for reachable nodes and push them onto the pending list 1928. As each symbol is pulled from the pending list 1926 and placed in the distribution list, it is checked to see that all nodes reachable there from are added to the pending list 1928 until all entry points in this class 1910, have been covered and all nodes reachable there from have been added 1926 to the distribution list under the header for this class 1904.

At 1914, once all classified entry points and nodes reachable there from have been added to the distribution lists, the method determines whether there are any entry points in the universe of input DLLs that have not yet been listed in one of the earlier classifications. If such entry points do exist 1914, then a final class is created 1916 a header is output 1904 and all entry points reachable there from 1906 along with nodes reachable there from 1920–1928, are included in the distribution lists.

At 1918, the distribution list is output.

FIG. 19 represents an example of how to provide functionality of FIG. 9 at step 908.

EXAMPLE 12

Exemplary Resource Reformulation Method

Figure 20:
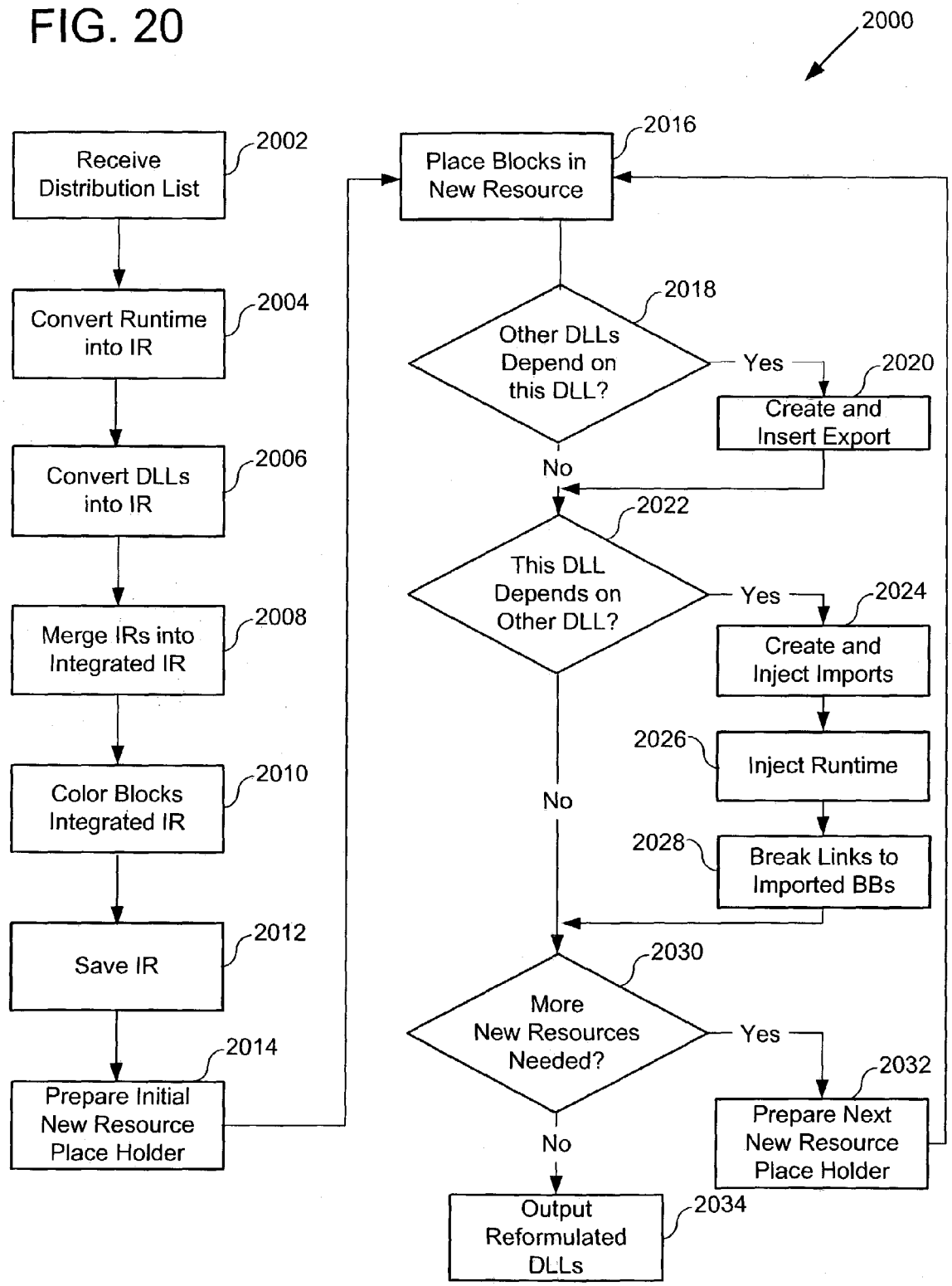
FIG. 20 is a flow chart for a method that reformulates resources.

FIG. 20 is a flow chart 2000 of an exemplary method for reformulating resources.

At 2002, the method receives a distribution list and saves it in memory.

At 2004, consume and convert the table mapping runtime into an internal representation (IR). The table mapping runtime is a procedure that is put into each new resource that has imports 2026. When the new resource is loaded into memory to support an application, the table mapping runtime, maps the imports to the corresponding DLLs, upon which the DLL depends. Converting the runtime into an IR, means to create a data structure graph of the basic blocks inside the table mapping runtime, so those basic blocks can be injected into each new resource with imports.

At 2006, convert the DLLs in the input universe into an internal representation (IR). Again, an internal representation is a data structure holding information about the DLL, such as nodes and edges. For example, a data structure graph identifying the basic blocks and control flow through basic blocks is created. This step 2006 is performed for every DLL in the input universe.

At 2008, the method merges all of the IRs 2006 into one big integrated internal representation (IR). The graphs of the DLLs created at step 2006 are integrated to create one big graph that resolves the dependencies between individuals DLLs. Thus, all the imports and exports are internally resolved in memory for the integrated graph. For example, if a DLL had a call or branch into another DLL, it would now be represented as an explicit call instead of a call through an import and export table. The integrated graph becomes one giant graph with explicit dependencies. At this point, the table mapping runtime is not called by any nodes, and it does not call any nodes in the other DLLs of the integrated graph. However, it needs to be included in the integrated internal representation, so it can be injected later into each new resource 2026 that has an import table. The table mapping runtime is desirable because it matches the import tables to export tables for the one way dependencies discussed with reference to FIG. 3 at 320, 326, and 328.

At 2010, the method associates each basic block in the integrated IR with the new DLL it is to be injected in according to the distribution list. For example, the method starts with entry points listed in the distribution list, and walks the integrated IR and colors each basic block reachable from that entry point.

For basic blocks that are not reached, there are two options. The first option would make sense, for example, when all applications on a system are in the input universe. In that case, since you have all the basic blocks needed within the DLLs by the applications in the system, all the relevant dependencies are resolved so the unreachable basic blocks are discarded. The second option is to just create a final and lowest order DLL to hold all of the presently non-reachable basic blocks. This option would be helpful if an application is later added to the system that reaches these nodes.

Once reachable nodes are colored according to the classification of their associated entry point, the coloring process is complete.

At 2012, the integrated colored IR is saved temporarily in memory. A data structure holds all the pieces of the integrated IR so that the nodes and edges can be injected into the new resources.

At 2014, an initial new resource place holder is created to receive the basic blocks and edges for the first order classification reachable nodes. A DLL not only has the basic blocks of instructions and data that are required, but also initial headers and system information to know how to load it, to indicate that it is a DLL and not an EXE, and to create holders for names, etc. This creates a new resource ready to receive the basic blocks.

At 2016, the method then walks the saved integrated and colored IR 2012, and places the graph of nodes reachable for this classification of colored nodes into the new resource place holder. The new resource is given the indicated name for this classification new resource, and the preferred loading address if desirable. The reachable basic blocks and associated edge relationships are copied or injected into the new resource.

At 2018, the method checks the saved integrated and colored IR to see if any basic blocks therein depend on the basic blocks in the new resource created at 2016. If lower order new resources contain nodes that depend on the nodes in this new resource, then those dependencies require an export table.

At 2020, since one or more lower order new resources depend on this new resource 2018, the method creates and injects an import table into this new resource.

At 2022, if a new resource contains nodes that depend on nodes within a higher order new resource, the method creates and injects imports into the new resource 2024, and injects a copy of the table mapping runtime IR 2026 into the new resource. Additionally, since the basic blocks in the new resource had explicit links to the imported basic blocks in the saved integrated and colored IR, those links are resolved instead to the injected import table.

At 2030, if more new resources are indicated by the distribution list, a new resource placeholder 2032 is created to hold the basic blocks for this new classification.

At 2016, the basic blocks colored with this new resource classification are injected to create the new resource. As before, if lower order new resources depend on this new resource 2018, exports are created and injected 2020, and if this new resource depends on a higher order new resource 2022, then imports and the table mapping runtime are injected 2024–2026, and links to imported basic blocks are resolved to the imports 2028.

At 2030, once all new resources are created, the method outputs the reformulated DLLs.

Optionally, uncolored nodes can be placed in a final order DLL, with a corresponding import table 2024 and runtime 2026.

Notice that the method accounts for the one way dependencies using import and export tables, which are mapped at runtime by the table mapping runtime 2026, which is injected into each DLL that depends on other DLLs. Notice also that the highest order new resource contains an export table (if any lower order resources depend on it), but no import table, and that the lowest order resource contains an import table (if it depends on any higher order DLLs), but no export table. When an application requiring a lower order resource is later loaded for processing, the table mapping runtime obtains the corresponding exports for the imports and resolves the links when the new resource DLLs are linked to the process address space.

Historically, during the build process, the compiler would have created the import-export tables in a way that the linker was designed to support. Since in this example, the new resources are created post-build, the table mapping runtime is injected to resolve the post-build imports.

FIG. 20 is an exemplary way to reformulate resources as discussed in FIG. 9 at step 910.

EXAMPLE 13

Exemplary Coloring Method

Figure 21:
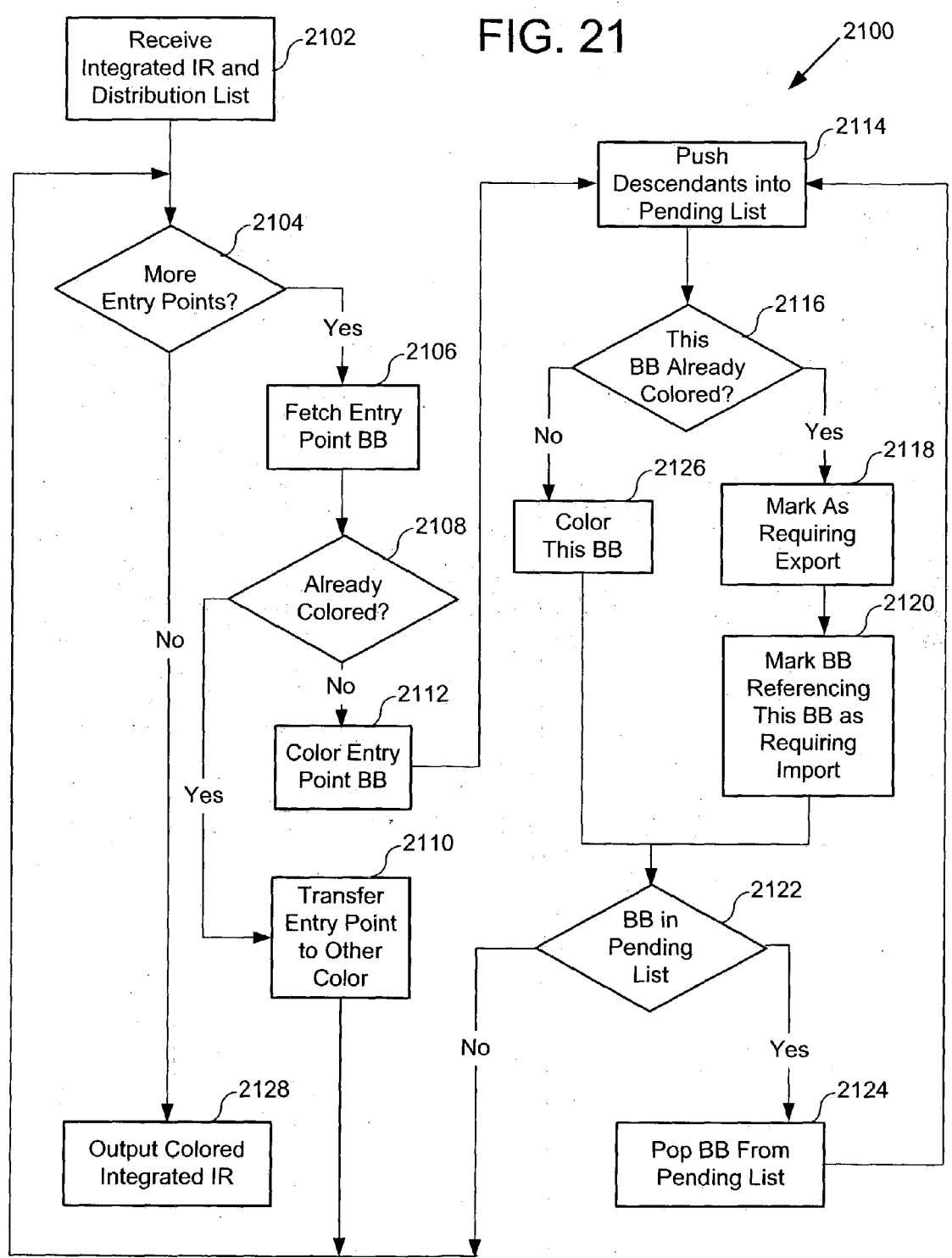
FIG. 21 is a flow chart for a method that colors reachable nodes.

FIG. 21 is a flow chart 2100 of an exemplary method of coloring basic block reachable from an entry point, with the classification of the entry point.

At 2102, the method receives the integrated IR and the distribution list.

At 2104, so long as more entry points exist in the distribution list, the method continues to color nodes reachable from entry points with the classification of that entry point in the distribution list. Once all entry points have been walked and colored, the method outputs a colored integrated IR 2128.

At 2106, since another entry point exists 2106, the method fetches the basic block identified by the entry point.

At 2108, the method determines whether the basic block identifiable by the entry point has already been colored. This would happen, for example, if while walking the integrated IR from a previous entry point, this entry point had been called from a basic block. In that case, this entry point would already be colored with the classification of that previous entry point. In that case, this entry point is transferred to the classification distribution list for that higher order new resource. For example, as shown in FIG. 10, if one or more entry points 1010–1012 reach a lower order entry point 1014–1018 during reachability analysis, that reached entry point is moved 1024 to the higher order classification.

At 2110, if the entry point is already colored 2108, it is transferred to the already colored higher order classification.

At 2112, if the entry point basic block is not already colored, the entry point basic block is colored with the classification of the present ("this") entry point.

At 2114, the method pushes all the directly reachable basic blocks ("descendants") of this basic block onto a pending list.

At 2116, since this (entry point) basic block was already colored 2112, the method next checks the integrated IR 2118 to see if any basic blocks will depend on this basic block. If so, this basic block is marked as requiring an export, and the block referencing this basic block is marked as requiring an import 2118–2120. In other cases, where this basic block is from the pending list 2114, it is less likely to be already colored 2116.

At 2116, if a basic block is not already colored, it is colored 2126, with the classification of the present entry point that is being walked 2112.

At 2122, if there are no more basic blocks on the pending list 2122 to process, the method returns to obtain another entry point from the distribution list 2104. If another basic block is on the pending list 2122, that basic block is obtained from the pending list 2124.

At 2124, the method pushes any descendants of the basic block 2124 onto the pending list.

At 2114, the method determines whether this basic block 2124 has already been colored. This could be the case, for example, if this basic block had already been reached from a previous entry point. Notice that if a block is not already reached, it stays in this color classification and requires only coloring 2126 and no import or export 2118–2120. However, if, while traversing blocks reachable from this entry point, a block is already colored, that indicates a control transfer to a higher order resource requiring associated import and export. Thus, the method 2100 supports the one-way dependency layering from lower order into higher order.

After the pending list is empty 2122, and there are no more entry points to process, the colored integrated IR is complete 2118.

FIG. 21 represents an example of the functionality described in FIG. 20 at step 2010.

EXAMPLE 14

Exemplary New Resources

Figure 22:
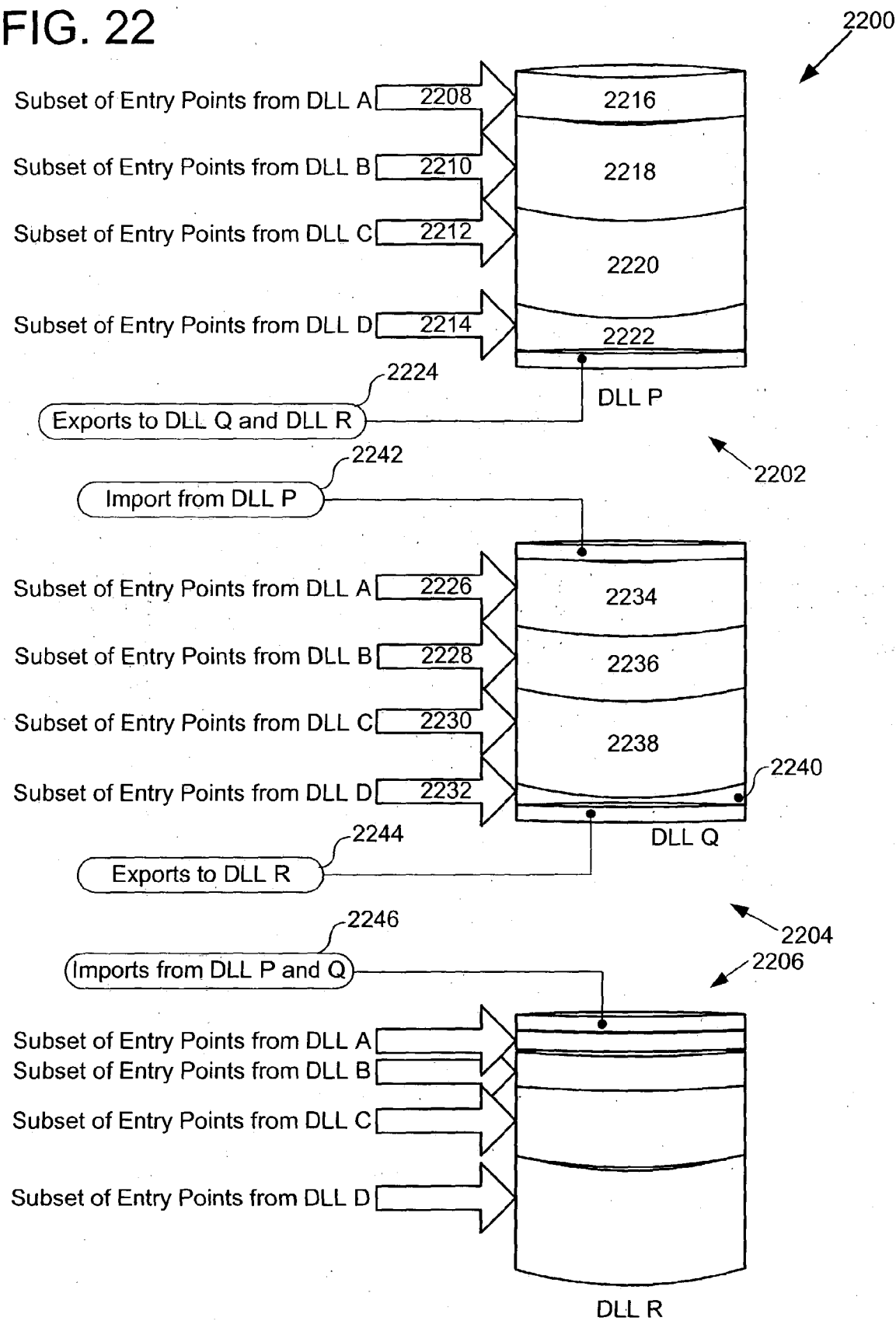
FIG. 22 is a graphical representation of reformulated resources.

FIG. 22 is a graphic representation of three new resources 2202–2206. In this example, four old resources A, B, C, and D (not shown), are reformulated into new resources. In this example, the distribution list included three new resource names called P.DLL 2202, Q.DLL 2204, and R.DLL 2206. By analyzing the imports of the highest order application(s), entry points were discovered into four old resources 2208–2214. From these entry points, nodes from the corresponding resources were reachable, and thus placed in the new highest order resource 2216–2222. Additionally, exports were created for dependent lower order resources 2224.

Similarly, exports of the second order applications were obtained 2226–2232 and traversed, and reachable nodes not already placed in the highest order resource, were placed into the second new resource Q.DLL, as shown 2234–2240. Additionally, imports to the higher order resource 2242, and exports to the lower order resource were created 2244.

Finally, imports to the lowest order application(s) were traverse and nodes not already in the highest or second order resource, are placed in the lowest order resource R.DLL 2206. Additionally, imports to higher order resources were created 2246. The created imports and exports 2224, 2242, 2244, 2246, support the one-way dependency relations.

EXAMPLE 15

Exemplary Features and Benefits

Allowing creation of customized DLLs without requiring changes to source code or make-file build arrangements creates new possibilities. For example, it allows various embedded versions of system resources. Resources can be stacked in various configurations based on various needs and memory restraints. Users can reconfigure general library resources for purposes such as processing requirements and embedded memory limitations.

Additionally, the method allows DLL creation based on functional expertise of development teams, yet functional specificity at the point of deployment so unused functionality is not wasting memory. Thus, allowing formulation based on actual usage requirements based on usage frequency or importance of functionality. This results in lower memory requirements and fewer disk accesses.

Many DLLs have spaghetti dependencies requiring many other DLLs to be loaded even when only small portions are utilized. Saner componentization based on reachability reduces DLL and memory requirements.

Further, the reachability of nodes within one DLL for a time sensitive or highest priority application further enables other optimizations that arrange blocks within a single DLL resource to increase efficiency.

FIG. 20 includes a couple of steps that are supported by other work of the assignees of this patent application. In creating the IR for DLLs in the input universe 2006, basic blocks are identified within DLLs. An exemplary method for determining basic blocks is discussed in Davidson et al., "Method and System for Improving the Locality of Memory References During Execution of a Computer Program," U.S. Pat. No. 6,292,934, which is incorporated herein by reference. Further, in creating an integrated IR 2008, a DLL merge tool can be helpful as discussed in Chan et al., "Shared Library Optimization for Heterogeneous Programs," U.S. Pat. No. 6,460,178, which is incorporated herein by reference.

Table A shows an exemplary grammar for a distribution list format.

TABLE A

[slicebinaries]
    newslice <slice name> [<preferred address>]
        <source binary> (<export name>|<ordinal>)

"Slicebinaries" is a keyword indicating that this is a distribution list with new resource names, old resource names, and entry point identifiers. "Newslice" is a keyword signaling that a new resource name called "slicename" follows. Optionally, a preferred load address follows the new resource name. Each entry point for the new resource is listed as the old resource "source binary" and an entry point into the old resource which can be an "export name" symbol or an "ordinal" entry point into the old resource.

Along with an output of reformulated DLLs, a number of optional features may be output if useful for a given situation. For example, the binary code for the basic blocks can be reversed compiled, and assembly language code representing the assembly language is output, as associated with basic blocks, if so desired. Further, a basic block map is output, which is helpful in debugging. Additionally, a library definition file is output that is used by the library manager to link the new resources. Further, if the method and systems described herein use program debug files (.pdb) as a resource to create the IRs, that information can be carried forward with the reformulated basic blocks, and output as associated with the corresponding new resources.

EXAMPLE 16

Exemplary Table Mapping Runtime

As discussed earlier, a table mapping runtime is injected into each new resource with imports (e.g., as discussed at 2026, FIG. 20).

An export has a memory location that contains the address of the exported object (i.e., code or data). This is the loaded address of the object, which is not necessarily the address of the object at link time, since DLLs may be loaded at an address different from the link address.

An import also has a memory location that is to contain the final address of the exported object. Thus, the table mapping runtime performs the steps discussed in Table B.

TABLE B

Get name of exporting DLL from import.
Load exporting DLL.
Load virtual address different from link time address if necessary to fit into the virtual address space of importing process. Patch tables to point to final address of exported objects.
Get name or ordinal of export from import.
Find matching name or ordinal from exporting object.
Copy final address of exported object to import.

EXAMPLE 17

Exemplary Selections of Functionality

While classifications can be created to serve the resource needs of existing applications, the technologies described herein do not require creating new resources in view of the imports of existing applications.

For example, product architects may simply draw up lists of application programming interfaces (i.e., APIs), that support different levels of functionality. In such an example, the APIs represent a subset of the APIs into the old resources, and are used as entry points into the new resources. These entry points are assembled into a distribution list and submitted as input to the technologies described herein.

For example, the classifier 202 described in FIG. 2 would generate a list of APIs or entry points into the available resources, and a user could select from the list. These entry points represent a distribution list of one or more classifications. After a user selects and/or classifies entry points using the classifier 202, the reformulator 204, the node identifier 206, and the dependency redirector 208, perform as described earlier. Forwarders would be used if the applications calling these new resources did not have their import tables changed.

Similarly, in FIG. 4, the classify step 402 would involve selecting APIs or entry points as opposed to examining imports in classified applications, and identifying reachable nodes 404, would use the selected entry points to begin identifying reachable nodes.

Additionally, this document and accompanying drawings discuss throughout, how to proceed once a distribution list is created. Thus, a product designer can select and create APIs representing entry points, and the described technologies will convert those entry points into new resources.

Product designers can use selections of functionality to provide different levels of functionality, for example, to create product-differentiation. For example, a product line may have a standard level, a moderate level, or an advanced level of functionality. This sort of product-differentiation allows the sale of economic versions producing revenue from additional sources, such as business, home, or academia.

This feature is also helpful in limited memory situations such as PDAs or embedded systems. By selecting APIs and entry points and creating new resources containing nodes reachable therefrom, products with limited memory capability can be managed more efficiently. In such cases, a device may require only one new resource containing the nodes reachable from the selected entry points. By allowing choices based on device memory and product design considerations, this selection feature brings great value to product design.

EXAMPLE 18

Computing Environment

Figure 23:
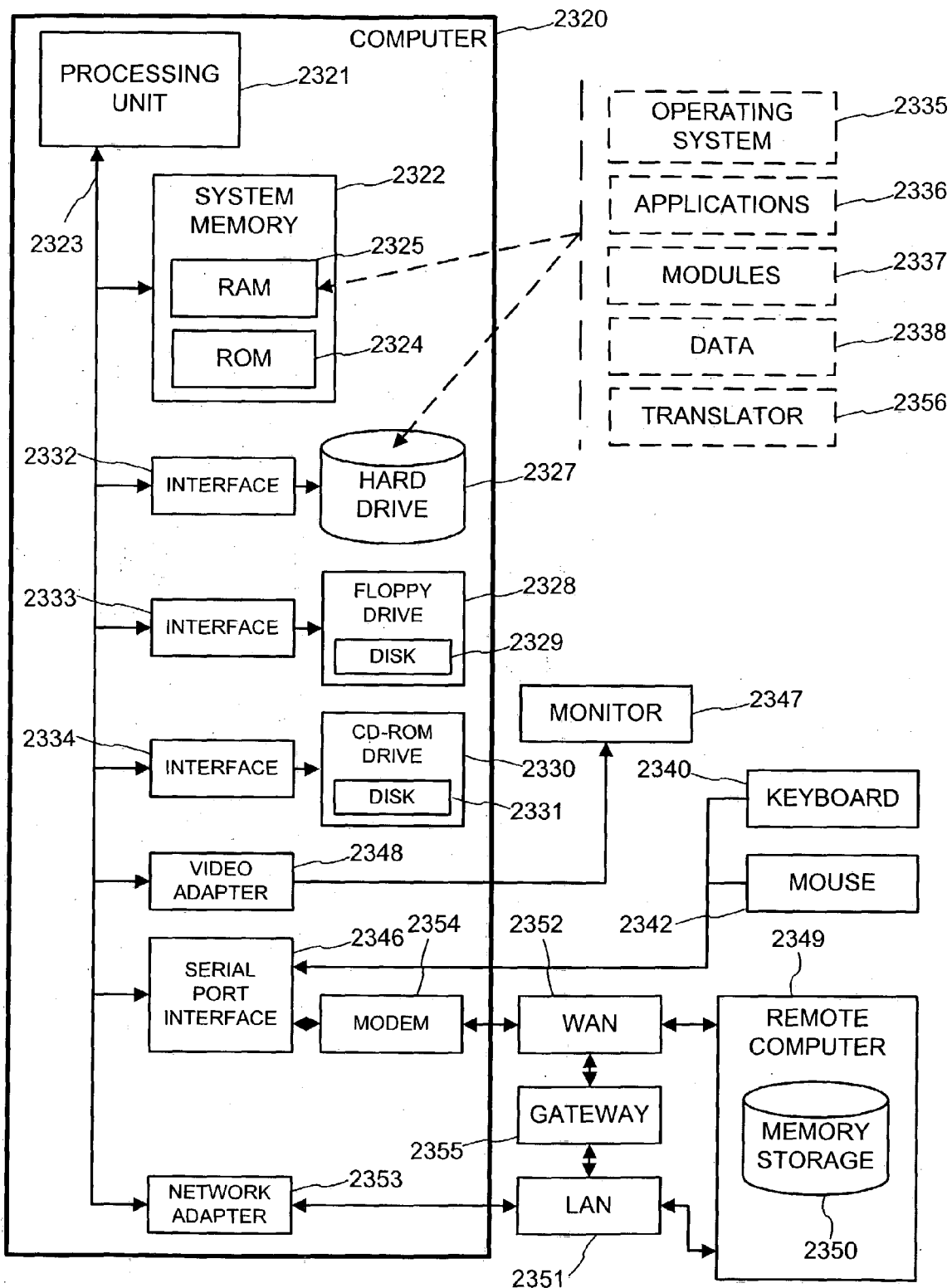
FIG. 23 is a block diagram of a distributed computer system implementing the described technologies.

FIG. 23 and the following discussion are intended to provide a brief, general description of a suitable computing environment for an implementation. While the invention will be described in the general context of computer-executable instructions of a computer program that runs on a computer and/or network device, those skilled in the art will recognize that the invention also may be implemented in combination with other program modules. Generally, program modules include routines, programs, components, data structures, etc. that perform particular tasks or implement particular abstract data types. Moreover, those skilled in the arts will appreciate that the invention may be practiced with other computer system configurations, including multiprocessor systems, microprocessor-based electronics, minicomputers, mainframe computers, network appliances, wireless devices, and the like. The extensions can be practiced in networked computing environments, or on stand-alone computers.

With reference to FIG. 23, an exemplary system for implementation includes a conventional computer 2320 (such as personal computers, laptops, servers, mainframes, and other variety computers) includes a processing unit 2321, a system memory 2322, and a system bus 2323 that couples various system components including the system memory to the processing unit 2321. The processing unit may be any of various commercially available processors, including Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also can be used as the processing unit 2321.

The system bus may be any of several types of bus structure including a memory bus or memory controller, a peripheral bus, and a local bus using any of a variety of conventional bus architectures such as PCI, VESA, AGP, Microchannel, ISA and EISA, to name a few. The system memory includes read only memory (ROM) 2324 and random access memory (RAM) 2325. A basic input/output system (BIOS), containing the basic routines that help to transfer information between elements within the computer 2320, such as during start-up, is stored in ROM 2324.

The computer 2320 further includes a hard disk drive 2327, a magnetic disk drive 2328, e.g., to read from or write to a removable disk 2329, and an optical disk drive 2330, e.g., for reading a CD-ROM disk 2331 or to read from or write to other optical media. The hard disk drive 2327, magnetic disk drive 2328, and optical disk drive 2330 are connected to the system bus 2323 by a hard disk drive interface 2332, a magnetic disk drive interface 2333, and an optical drive interface 2334, respectively. The drives and their associated computer-readable media provide nonvolatile storage of data, data structures, computer-executable instructions, etc. for the computer 2320. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 2325, including an operating system 2335, one or more application programs 2336, other program modules 2337, and program data 2338; in addition to an implementation 2356.

A user may enter commands and information into the computer 2320 through a keyboard 2340 and pointing device, such as a mouse 2342. These and other input devices are often connected to the processing unit 2321 through a serial port interface 2346 that is coupled to the system bus, but may be connected by other interfaces, such as parallel port, game port or a universal serial bus (USB). A monitor 2347 or other type of display device is also connected to the system bus 2323 via an interface, such as a video adapter 2348. In addition to the monitor, computers typically include other peripheral output devices (not shown), such as speakers and printers.

The computer 2320 operates in a networked environment using logical connections to one or more remote computers, such as a remote computer 2349. The remote computer 2349 may be a server, a router, a peer device or other common network node, and typically includes many or all of the elements described relative to the computer 2320, although only a memory storage device 2350 has been illustrated. The logical connections depicted include a local area network (LAN) 2351 and a wide area network (WAN) 2352. Such networking environments are commonplace in offices, enterprise-wide computer networks, intranets and the Internet.

When used in a LAN networking environment, the computer 2320 is connected to the local network 2351 through a network interface or adapter 2353. When used in a WAN networking environment, the computer 2320 typically includes a modem 2354 or other means for establishing communications (e.g., via the LAN 2351 and a gateway or proxy server 2355) over the wide area network 2352, such as the Internet. The modem 2354, which may be internal or external, is connected to the system bus 2323 via the serial port interface 2346. In a networked environment, program modules depicted relative to the computer 2320, or portions thereof, may be stored in the remote memory storage device. It will be appreciated that the network connections shown are exemplary and other means of establishing a communications link between the computers may be used.

Alternatives

Having described and illustrated the principles of our invention with reference to an illustrated examples, it will be recognized that the examples can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa. Techniques from one example can be incorporated into any of the other examples.

In view of the many possible embodiments to which the principles of our invention may be applied, it should be recognized that the details are illustrative only and should not be taken as limiting the scope of our invention. Rather, we claim as our invention all such embodiments as may come within the scope and spirit of the following claims and equivalents thereto.

I claim:

1. A method comprising:
   receiving a distribution list comprising two or more shared resources comprising dynamically linkable libraries, and two or more classified entry points into the shared resources;
   for each classified entry point, identifying a graph of nodes and edges reachable within the shared resources wherein the graph represents basic blocks reachable within the two or more shared resources;
   creating a new first order resource comprising a single dynamically linkable file comprising the assembled nodes of a graph representing basic blocks reachable within the two or more shared resources from one or more first order classified entry points;
   creating a new second order resource comprising a single dynamically linkable file comprising the assembled nodes of a graph representing basic blocks reachable from one or more second order classified entry points and not reachable from the one or more first order classified entry points;
   creating dependency relations for nodes in the new first order resource depended on by nodes in the new second order resource; and
   dynamically linking the new first order resource into an application's address space in order to provide computing services to a user.

2. The method of claim 1 further comprising:
   creating a new third order resource comprising a single dynamically linkable file comprising the assembled nodes of a graph representing basic blocks reachable from one or more third order classified entry points and not reachable from the one or more first or second order classified entry points; and
   creating dependency relations for nodes in the new first and second order resources depended on by nodes in the new third order resource.

3. The method of claim 2 wherein a table mapping runtime is injected into the new second and third order resources for resolving dependency relations with explicit links.

4. The method of claim 2 wherein upon executing a third order classified application, the new first, second, and third order resources are loaded into the third order classified application's process address space.

5. The method of claim 2 wherein upon executing a second order classified application, the new first and second order resources, but not the new third order resource, are loaded into the second order classified application's process address space.

6. The method of claim 2 wherein upon executing a first ordered classified application, the new first order resource, but not the new second or third order resources, are loaded into the first ordered classified application's process address space.

7. The method of claim 1 further comprising:
creating plural additional new order resources comprising nodes reachable from entry points classified for each of the new ordered resources; and
creating dependency relations for nodes in the plural new resources that depend on nodes in higher order resources.

8. The method of claim 7 further comprising:
creating a final order resource comprising nodes not-reachable from entry points in the distribution list; and
creating dependency relations for nodes in the final order resource that depend on reachable nodes in the higher order resources.

9. A method of reformulating compiled resources comprising:
receiving a distribution list;
converting resources comprising dynamically linked libraries in the distribution list into an internal representation comprising data structure of information about control flow through basic blocks of the resources comprising dynamically linked libraries;
merging the internal representations into an integrated representation comprising a graph that resolves dependencies between individual resources comprising dynamically linked libraries;
from classified entry points in the distribution list, coloring reachable nodes in the integrated representation with a classification of a color classification of a highest order entry point that reaches a node;
create new resources for each color classification;
inject colored nodes into a new resource of its corresponding color;
inject imports into new resources when nodes of the new resource depend on nodes of a color classification of a higher order;
inject exports into new resources when nodes of the new resource are depended on by nodes of a color classification of a lower order; and
dynamically linking at least one new resource into an application's address space in order to provide computing services to a user.

10. The method of claim 9 further comprising:
injecting a table mapping runtime into new resources with imports.

11. The method of claim 9 wherein coloring nodes reachable in the integrated representation comprises pushing descendant nodes into a pending list.

12. The system of claim 11 wherein nodes are basic blocks, and already colored basic blocks taken from the pending list are marked for requiring import and export relations.

13. The method of claim 9 wherein the created new resources have a one-way dependency relationship wherein no higher order color classification new resource depends on any lower order color classification new resource.

14. A computer system comprising:
a CPU coupled to main memory and secondary memory;
the memory comprising a node identifier for walking a control flow through reachable basic blocks to create graphs of basic blocks reachable in plural shared resources comprising dynamic linkable files, a resource reformulator for assembling reachable basic blocks in created graphs into a shared resource comprising a dynamically linkable file, a dependency redirector, plural shared resources, and a distribution list comprising a list of classified entry points, each entry point associated with a new shared resource name, and each entry point represents a graph of reachable nodes in the shared resources; and
the memory further comprising an application providing requested computing services to a user, wherein the application is dynamically linked to a shared resource comprising a dynamically linkable file including basic blocks assembled from plural shared resources.

15. The system of claim 14 wherein the distribution list further comprises a request to reformulate the new shared resources with the graphs of reachable nodes.

16. The method of claim 14 wherein the distribution list further comprises a request to the dependency redirector, to create one way dependency relations for the new shared resources.

17. A computer-readable storage medium having executable instructions for performing a method comprising:
receiving a distribution list comprising two or more shared resources, and two or more classified entry points into the shared resources;
for each classified entry point, identifying a graph of nodes and edges reachable within the shared resources, each shared resources comprising a dynamically linkable file with the nodes comprising basic blocks reachable via control flow through the edges of the graph;
creating a new first order resource comprising a dynamically linkable file of assembled nodes reachable from first order classified entry points;
creating a new second order resource comprising a dynamically likable file of assembled nodes reachable from second order classified entry points and not reachable from first order classified entry points; and
creating dependency relations for nodes in the first order resource depended on by nodes in the second order resource.

18. The computer-readable storage medium of claim 17 further comprising:
creating a new third order resource comprising a dynamically linkable file of assembled nodes reachable from third order classified entry points and not reachable from first or second order classified entry points; and
creating dependency relations for nodes in the first and second order resources depended on by nodes in the third order resource.

19. The computer-readable storage medium of claim 18 further comprising:
a table mapping runtime is injected into the new second and third order resources for resolving dependency relations with explicit links.

20. A computer-readable storage medium of claim 18 further comprising:

upon executing a third order classified application, the new first, second, and third order resources are loaded into the third order classified applications process address space.

21. A computer-readable storage medium of claim 18 further comprising:

upon executing a second order classified application, the new first and second order resources, but not the new third order resource, are loaded into the second order classified application's process address space.

22. A computer-readable storage medium of claim 18 further comprising:

upon executing a first ordered classified application, the new first order resource, but not the new second or third order resource, are loaded into the first ordered classified application's process address space.

23. A computer-readable storage medium of claim 17 further comprising:

creating plural additional new order resources comprising a dynamically linkable file of assembled nodes reachable from entry points classified for each of the new ordered resources; and creating dependency relations for nodes in the plural new resources that depend on nodes in higher order resources.

24. A computer-readable storage medium of claim 23 further comprising:

creating a final order resource comprising a dynamically linkable file of assembled nodes not-reachable from entry points in the distribution list; and creating dependency relations for nodes in the final order resource that depend on reachable nodes in the higher order resources.

25. A method of reformulating compiled resources comprising:

displaying a list of application programming interfaces available for accessing shared resources;

receiving selections of application programming interfaces;

converting selections into a distribution list;

creating an internal representation of nodes reachable from entry points in the distribution list, the internal representation comprising data about control flow through basic blocks of the resources comprising plural dynamically linkable libraries; and creating a new resource comprising the internal representation and executing the new resource locally in a process address space of an executing application program providing computing services to a user.

26. A method of reformulating compiled resources comprising:

displaying a list of application programming interfaces available for accessing shared resources;

receiving selections of application programming interfaces, wherein selections include classifications;

converting selections and classifications into a distribution list;

creating an internal representation of nodes reachable from entry points in the distribution list;

coloring reachable nodes in the integrated representation with a color classification of a highest order classified entry point that reaches a node;

creating a new resources for each color classification;

injecting colored nodes into a new resource of its corresponding color;

injecting imports into new resources when nodes of the new resource depend on nodes of a color classification of a higher order;

injecting exports into new resources when nodes of the new resource are depended on by nodes of a color classification of a lower order; and dynamically linking the created new resources for at least two or more color classifications into the address space for a single application providing local computing services to a user.

* * * * *